United States Patent
Shibata et al.

(10) Patent No.: US 11,106,740 B2
(45) Date of Patent: Aug. 31, 2021

(54) SEARCH DEVICE, SEARCH SYSTEM, SEARCH METHOD, AND COMPUTER READABLE MEDIUM

(71) Applicant: MITSUBISHI ELECTRIC CORPORATION, Tokyo (JP)

(72) Inventors: Yoichi Shibata, Tokyo (JP); Yoshihiro Koseki, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 56 days.

(21) Appl. No.: 16/490,445

(22) PCT Filed: Apr. 25, 2017

(86) PCT No.: PCT/JP2017/016358
§ 371 (c)(1),
(2) Date: Aug. 30, 2019

(87) PCT Pub. No.: WO2018/198192
PCT Pub. Date: Nov. 1, 2018

(65) Prior Publication Data
US 2020/0142933 A1    May 7, 2020

(51) Int. Cl.
*G06F 16/903* (2019.01)
*G06F 16/9032* (2019.01)
*G06F 21/60* (2013.01)

(52) U.S. Cl.
CPC .. *G06F 16/90348* (2019.01); *G06F 16/90328* (2019.01); *G06F 21/602* (2013.01)

(58) Field of Classification Search
CPC ......... G06F 16/90328; G06F 16/90348; G06F 21/602
See application file for complete search history.

(56) References Cited

U.S. PATENT DOCUMENTS 6,169,999 B1    1/2001    Kanno
6,493,713 B1    12/2002   Kanno
(Continued)

FOREIGN PATENT DOCUMENTS

EP    2960808 A1    12/2015
JP    4-340164 A    11/1992
(Continued)

OTHER PUBLICATIONS

Agrawal et al., "Searching with Numbers," Proceedings of the 11th International Conference on World Wide Web, ACM, Honolulu, Hawaii, May 7, 2002, XP058122195, pp. 420-431 (12 pages total).
(Continued)

*Primary Examiner* — Baoquoc N To
(74) *Attorney, Agent, or Firm* — Birch, Stewart, Kolasch & Birch, LLP

(57) ABSTRACT

A search device (300) transmits a search condition to a management device (400) that manages a numerical value which is a number sequence of one or more digits, based on a digit-by-digit correspondence between a number of each digit of the numerical value and a digit representation which is a symbol representing a digit. A grouping unit performs grouping on a plurality of search-target numerical values to be searched for, each of which is a number sequence of one or more digits, on a basis of commonality of the number of digits and commonality of a number sequence from a most significant digit, so as to generate one or more numerical value groups. A search condition generation unit generates, for each numerical value group, a search condition element by establishing a correspondence between a number of each digit of a sequence common range, which is a range of a number sequence common to search-target numerical values included in each numerical value group, and the digit representation of each digit of the sequence common range,
(Continued)

and generates the search condition by integrating the search condition element of each numerical value group. A transmission unit (305) transmits the search condition generated by the search condition generation unit to the management device (400).

8 Claims, 18 Drawing Sheets

(56) References Cited

U.S. PATENT DOCUMENTS

| | | |
|---|---|---|
| 2005/0102499 A1 | 5/2005 | Kosuga et al. |
| 2011/0302166 A1 | 12/2011 | Moriya et al. |
| 2012/0159180 A1 | 6/2012 | Chase et al. |
| 2013/0262863 A1 | 10/2013 | Yoshino et al. |
| 2013/0287210 A1 | 10/2013 | Matsuda et al. |
| 2013/0332729 A1 | 12/2013 | Ito et al. |
| 2014/0331044 A1 | 11/2014 | Fujii et al. |
| 2015/0046450 A1 | 2/2015 | Yoshino et al. |
| 2015/0371062 A1 | 12/2015 | Ito et al. |
| 2015/0381578 A1* | 12/2015 | Thota .................. H04L 63/1408 713/168 |
| 2016/0048690 A1* | 2/2016 | Tanishima ............. G16B 50/40 713/193 |
| 2016/0335450 A1 | 11/2016 | Yoshino et al. |
| 2019/0036679 A1 | 1/2019 | Hirano et al. |

FOREIGN PATENT DOCUMENTS

| | | |
|---|---|---|
| JP | 4-340165 A | 11/1992 |
| JP | 10-334118 A | 12/1998 |
| JP | 2005-101883 A | 4/2005 |
| JP | 2005-134990 A | 5/2005 |
| JP | 2006-072585 A | 3/2006 |
| JP | 2006-113704 A | 4/2006 |
| JP | 2010-224655 A | 10/2010 |
| JP | 2012-123614 A | 6/2012 |
| JP | 2012-164031 A | 8/2012 |
| JP | 2013-152512 A | 8/2013 |
| JP | 2014-126621 A | 7/2014 |
| JP | 2015-035072 A | 2/2015 |
| JP | 2015-135541 A | 7/2015 |
| JP | 2016-143048 A | 8/2016 |
| JP | 6038427 B1 | 12/2016 |
| WO | WO 2010/047286 A1 | 4/2010 |
| WO | WO 2012/004880 A1 | 1/2012 |
| WO | WO 2012/095973 A1 | 7/2012 |
| WO | WO 2012/115031 A1 | 8/2012 |
| WO | WO 2013/080365 A1 | 6/2013 |
| WO | WO 2014/128958 A1 | 8/2014 |

OTHER PUBLICATIONS

Communication pursuant to Article 94(3) EPC for European Application No. 16884955.2, dated Jan. 14, 2020.
Extended European Search Report for European Application No. 17907937.1, dated Jan. 10, 2020.
Chinese Office Action for Chinese Application No. 201680076736.4 dated Oct. 30, 2020 with English translation.
European Summons to Attend Oral Proceedings Pursuant to Rule 115(1) EPC for European Application No. 17907937.1, dated Dec. 14, 2020.
European Office Action for European Application No. 17907937.1, dated May 14, 2020.
Indian Office Action for Indian Application No. 201847024269, dated Nov. 25, 2020, with English translation.
U.S. Office Action dated Aug. 19, 2020 for U.S. Appl. No. 16/061,264.
Chase et al., "Substring-Searchable Symmetric Encryption", Proceedings on Privacy Enhancing Technologies, vol. 2, 2015, pp. 263-281.
Curtmola et al., "Searchable Symmetric Encryption: Improved Definitions and Efficient Constructions", Journal of Computer Security, vol. 19, 2011, pp. 895-934.
European Office Action dated Jul. 19, 2019 forApplication No. 17738450.0.
European Office Action dated Mar. 15, 2019 for Application No. 17738450.0.
Extended European Search Report for European Application No. 16884955.2, dated Feb. 7, 2019.
Extended European Search Report for European Application No. 17738450.0, dated Sep. 5, 2018.
Hahn et al., "Searchable Encryption with Secure and Efficient Updates", Proceedings of the ACM Conference on Computer and Communications Security, 2014, pp. 310-320.
International Search Report dated Jun. 27, 2019, for International Application No. PCT/JP2017/016358.
International Search Report for PCT/JP2016/051006 (PCT/ISA/210) dated Apr. 5, 2016.
International Search Report for PCT/JP2016/051158 (PCT/ISA/210) dated Apr. 12, 2016.
International Search Report for PCT/JP2016/079421 (PCT/ISA/210) dated Dec. 27, 2016.
International Search Report for PCT/JP2017/000679 (PCT/ISA/210) dated Apr. 4, 2017.
Li et al., "Fuzzy Keyword Search over Encrypted Data in Cloud Computing", Proceedings of IEEE INFOCOM, 2010, 5 pages.
Partial Supplementary European Search Report for European Application No. 16884955.2, dated Oct. 1, 2018.
Wang et al., "Achieving Usable and Privacy-assured Similarity Search over Outsourced Cloud Data", Proceedings of IEEE INFOCOM, 2012, pp. 451-459.
International Search Report dated Jun. 27, 2017, for International Application No. PCT/JP2017/016358.

* cited by examiner

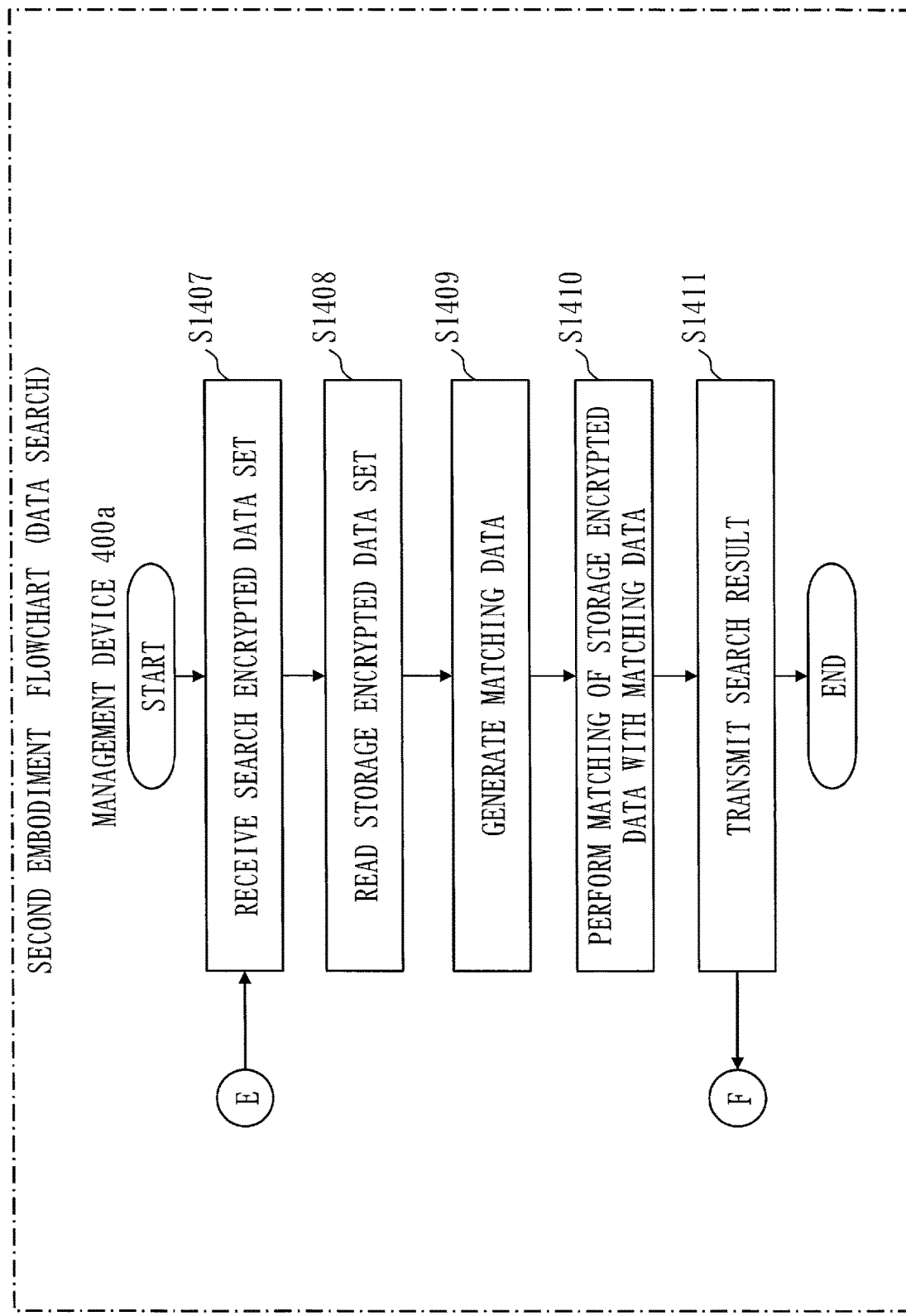

SEARCH DEVICE, SEARCH SYSTEM, SEARCH METHOD, AND COMPUTER READABLE MEDIUM

TECHNICAL FIELD

The present invention relates to searching of data.

BACKGROUND ART

There is a search system as a system for efficiently obtaining necessary data from data collected from sources such as the Internet. In the search system, in order to reduce search time and improve the accuracy of search results, information to assist searching may be added to the collected data when the data is registered in a database.

For example, Patent Literature 1 discloses a search system and a search method that facilitate finding of a necessary document.

More specifically, in a technique of Patent Literature 1, text constituting a document is divided into a plurality of blocks. A hash value of each block is added to the text together with position information, and the text, the hash value, and the position information are registered. Then, in searching, the document is searched for based on the position information and the hash value.

Patent Literature 2 and Patent Literature 3 disclose methods for retrieving a keyword sequence from a search file.

More specifically, in techniques of Patent Literature 2 and Patent Literature 3, a keyword sequence to be searched for is divided into single characters. A search file is generated, in which position information of individual characters and attribute information of keywords are grouped according to the types of characters. Then, in searching, position information of characters constituting a search input is retrieved from the search file for matching, thereby to retrieve a keyword sequence having the same order of characters and the same keyword attribute information as those of the search input.

Patent Literature 4 discloses a method for searching for character data having a partially matching string.

In a technique of Patent Literature 4, a registration device divides string data which is storage data into single characters and encrypts substrings generated from individual characters. Further, the registration device encrypts the encrypted substrings together with position information to generate storage encrypted data. Then, the registration device registers the storage encrypted data in a management device.

In searching, a search device encrypts string data which is search data to generate search encrypted data. Then, the search device transmits the search encrypted data to the management device. The management device encrypts the received search encrypted data together with position information and performs matching of the search encrypted data that has been encrypted with the storage encrypted data.

By the above method, Patent Literature 4 allows searching of character data having a partially matching string without causing the string data in the storage data and the string data in the search data to be revealed in the management device.

CITATION LIST

Patent Literature

Patent Literature 1: WO 2010/047286 A1
Patent Literature 2: JP 04-340164 A
Patent Literature 3: JP 04-340165 A
Patent Literature 4: JP 6038427 B

SUMMARY OF INVENTION

Technical Problem

In the techniques of Patent Literature 1 to Patent Literature 4, character data is divided into single characters and the divided characters are registered together with position information. Then, matching between registered registration data and search data is performed so as to search for registration data including characters matching the search data among the registration data.

However, a problem is that in a situation where character data is numerical values, and numerical values included in a specific numerical value range are searched for, inappropriate character data may be included as noise in a search result.

For example, assume an example in which numerical values included in a numerical value range "100 to 109" are searched for. In the techniques of Patent Literature 1 to Patent Literature 4, a search can be performed using a number (string) "10" which is common to all values within "100 to 109" as search data. There may be a case in which registration data includes "10" or "1000" which does not fall within "100 to 109". In this case, since these numerical values include the number matching the search data "10", they are output as a search result although these numerical values are not included in the numerical value range "100 to 109".

Note that it is conceivable to individually search for all the numerical values included in the specific numerical value range in order to prevent a search result different from the intention of the search from being output as in the above case. However, the number of times of searching increases in proportion to the number of numerical values included in the specific numerical range, resulting in an increase in search time as a whole.

It is a main object of the present invention to enable efficient and accurate searching of numerical values.

Solution to Problem

A search device according to the present invention transmits a search condition to a management device that manages a numerical value which is a number sequence of one or more digits, based on a digit-by-digit correspondence between a number of each digit of the numerical value and a digit representation which is a symbol representing a digit, and the search device includes:

a grouping unit to perform grouping on a plurality of search-target numerical values to be searched for, each of which is a number sequence of one or more digits, on a basis of commonality of the number of digits and commonality of a number sequence from a most significant digit, so as to generate one or more numerical value groups;

a search condition generation unit to generate, for each numerical value group, a search condition element by establishing a correspondence between a number of each digit of a sequence common range, which is a range of a number sequence common to search-target numerical values included in each numerical value group, and the digit representation of each digit of the sequence common range, and generate the search condition by integrating the search condition element of each numerical value group; and a transmission unit to transmit the search condition generated by the search condition generation unit to the management device.

Advantageous Effects of Invention

According to the present invention, efficient and accurate searching of numerical values can be performed.

BRIEF DESCRIPTION OF DRAWINGS

FIG. 18 is a flowchart illustrating the data search process of the search system according to the second embodiment.

DESCRIPTION OF EMBODIMENTS

Embodiments of the present invention will be described hereinafter with reference to the drawings. In the description and the drawings of the embodiments below, parts denoted by the same reference signs indicate the same or corresponding parts.

First Embodiment

This embodiment describes an example in which numerical values included in a specific numerical value range are searched for when character data is numerical values. This embodiment also describes a search system that outputs accurate search results while preventing an increase in search time.

Description of Configuration

Figure 1:
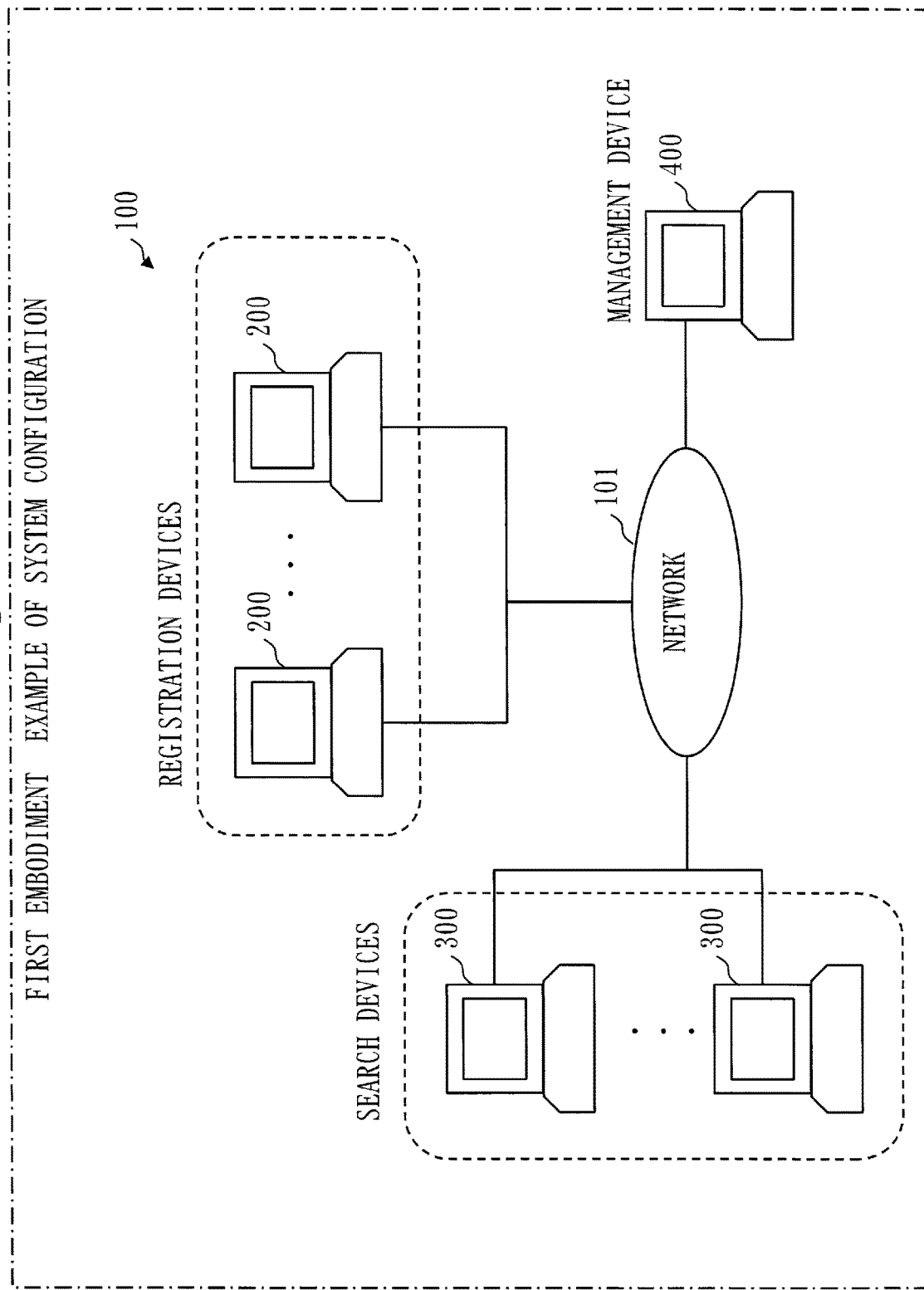
FIG. 1 is a diagram illustrating an example of a system configuration of a search system according to a first embodiment.

FIG. 1 illustrates an example of a configuration of a search system 100 according to this embodiment.

As illustrated in FIG. 1, the search system 100 includes a plurality of registration devices 200, a plurality of search devices 300, and a management device 400.

The search system 100 may include only one registration device 200. The search system 100 may include only one search device 300. The search system 100 may include a plurality of management devices 400.

A network 101 is a communication channel to connect the plurality of registration devices 200, the plurality of search devices 300, and the management device 400.

For example, the network 101 is the Internet or a local area network (LAN) installed in a company.

The network 101 is a communication channel to connect the plurality of registration devices 200, the plurality of search devices 300, and the management device 400.

The registration device 200 is, for example, a personal computer. The registration device 200 is a computer that operates as a registration terminal to register storage data in the management device 400. The registration device 200 generates storage data and requests the management device 400 to store the storage data. The registration device 200 may generate storage data including a numerical value.

The search device 300 is, for example, a personal computer. The search device 300 is a computer that transmits search data which is a search condition to the management device 400, then receives a search result from the management device 400, and outputs the search result. The search device 300 transmits search data to the management device 400 and requests matching of the storage data with the search data. The search device 300 outputs a search result returned from the management device 400. Note that the process performed by the search device 300 corresponds to a search method and a search program.

The management device 400 has a large-capacity recording medium to store storage data generated by the registration device 200. When storage of storage data is requested by the registration device 200, the management device 400 stores the storage data. At least part of storage data stored in the management device 400 includes numerical values. When a search is requested by the search device 300, the management device 400 performs matching of the storage data with the search data and transmits a search result to the search device 300.

Note that the registration device 200 and the search device 300 may be included together in the same personal computer.

Configurations of this embodiment will be described below.

As illustrated in FIG. 1, the search system 100 includes the registration device 200, the search device 300, and the management device 400.

A configuration of the registration device 200, a configuration of the search device 300, and a configuration of the management device 400 will be described below in this order.

Figure 2:
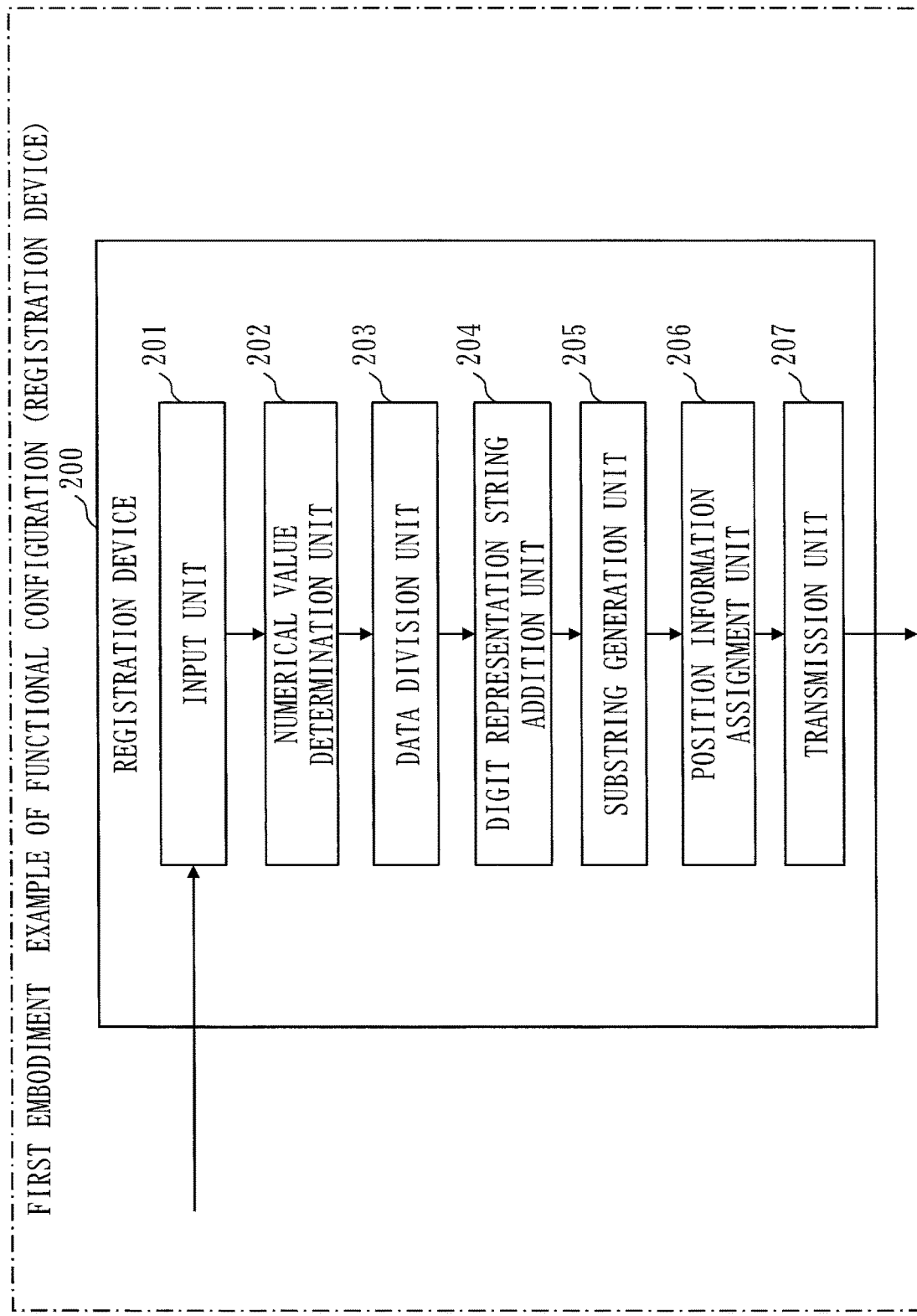
FIG. 2 is a diagram illustrating an example of a functional configuration of a registration device according to the first embodiment.

FIG. 2 illustrates an example of a functional configuration of the registration device 200. As illustrated in FIG. 2, the registration device 200 has an input unit 201, a numerical value determination unit 202, a data division unit 203, a digit representation string addition unit 204, a substring generation unit 205, a position information assignment unit 206, and a transmission unit 207. Note that although not illustrated in FIG. 2, the registration device 200 has a recording medium to store data used in the constituent elements of the registration device 200, as will be described later.

The input unit 201 acquires storage data and a data name that are input from a data registrant (user). Note that storage data is referred to as storage data D and a data name is referred to as ID(D) in this embodiment. If no data name is input from the data registrant, the input unit 201 may assign a random number to the data name ID(D) of the input storage data D, or may assign an integer value greater than 0 sequentially, so as not to overlap with the data names of other pieces of storage data. The data name ID(D) is an identifier for identifying the storage data D.

The numerical value determination unit 202 determines whether a numerical value of one or more digits (that is, a string in which one or more numbers are arranged) is included in the storage data D acquired from the input unit 201. If a numerical value is included in the storage data D, the numerical value determination unit 202 extracts the numerical value as numerical value data DN. Note that the numerical value data DN included in the storage data D corresponds to a management-target numerical value.

The data division unit 203 divides the numerical value data DN acquired from the numerical value determination unit 202 as $(w_L, \ldots, w_1)$, where L is the number of characters constituting the numerical value data DN. Each $w_i$ ($1 \leq i \leq L$) is each character (each number) obtained by dividing the numerical value data DN sequentially into single characters. When the numerical value data DN=123, then L=3, $W_3=1$, $W_2=2$, and $W_1=3$.

The digit representation string addition unit 204 adds a digit representation $(d_1, \ldots, d_L)$, which is a special string (symbol) assigned to each digit to represent the digit, to each piece of divided data $(w_L, \ldots, w_1)$ acquired from the data division unit 203. A set obtained by adding a digit representation to each character of the divided data will be referred to as a digit-representation-added character set $(w_L d_L, \ldots, w_1 d_1)$. Digit representations are, for example, $d_3=\gamma$, $d_2=\beta$, and $d_1=\alpha$. Therefore, the digit representation string addition unit 204 generates $(1\gamma, 2\beta, 3\alpha)$ as a digit-representation-added character set of the divided data (1, 2, 3).

The substring generation unit 205 generates a set A as indicated below from the digit-representation-added character set $(w_L d_L, \ldots, w_1 d_1)$ acquired from the digit representation string addition unit 204.

$$A=\{(w_L d_L),(w_L d_L w_{L-1} d_{L-1}), \ldots, (w_L d_L \cdots w_1 d_1)\}$$

For example, the substring generation unit 205 generates $A=\{(1\gamma), (1\gamma, 2\beta), (1\gamma, 2\beta, 3\alpha)\}$ from the digit-representation-added character set $(1\gamma, 2\beta, 3\alpha)$.

In the following, the set A will be referred to as a substring set A. The substring set A indicates a digit-by-digit correspondence relationship between a number of each digit of the numerical value data DN and a digit representation. The substring set corresponds to correspondence information.

The position information assignment unit 206 assigns position information to each substring in the substring set A acquired from the substring generation unit 205, as indicated below, to generate a set B.

$$B=\{(L, w_L d_L),(L'-1, w_L d_L w_{L-1} d_{L-1}), \ldots, (1, w_L d_L \cdots w_1 d_1)\}$$

For example, the position information assignment unit 206 generates a set B below for the substring set $A=\{(1\gamma), (1\gamma, 2\beta), (1\gamma, 2\beta, 3\alpha)\}$.

$$B=\{(3,1\gamma),(2,1\gamma,2\beta),(1,1\gamma,2\beta,3\alpha)\}$$

In the following, the set B will be referred to as a position-information-added substring set. The position-information-added substring set for the storage data D will be referred to as B(D).

In the following, a pair (ID(D), B(D)) will be referred to as a storage data set.

The transmission unit 207 transmits the storage data set (ID(D), B(D)) acquired from the position information assignment unit 206 to the management device 400.

Figure 3:
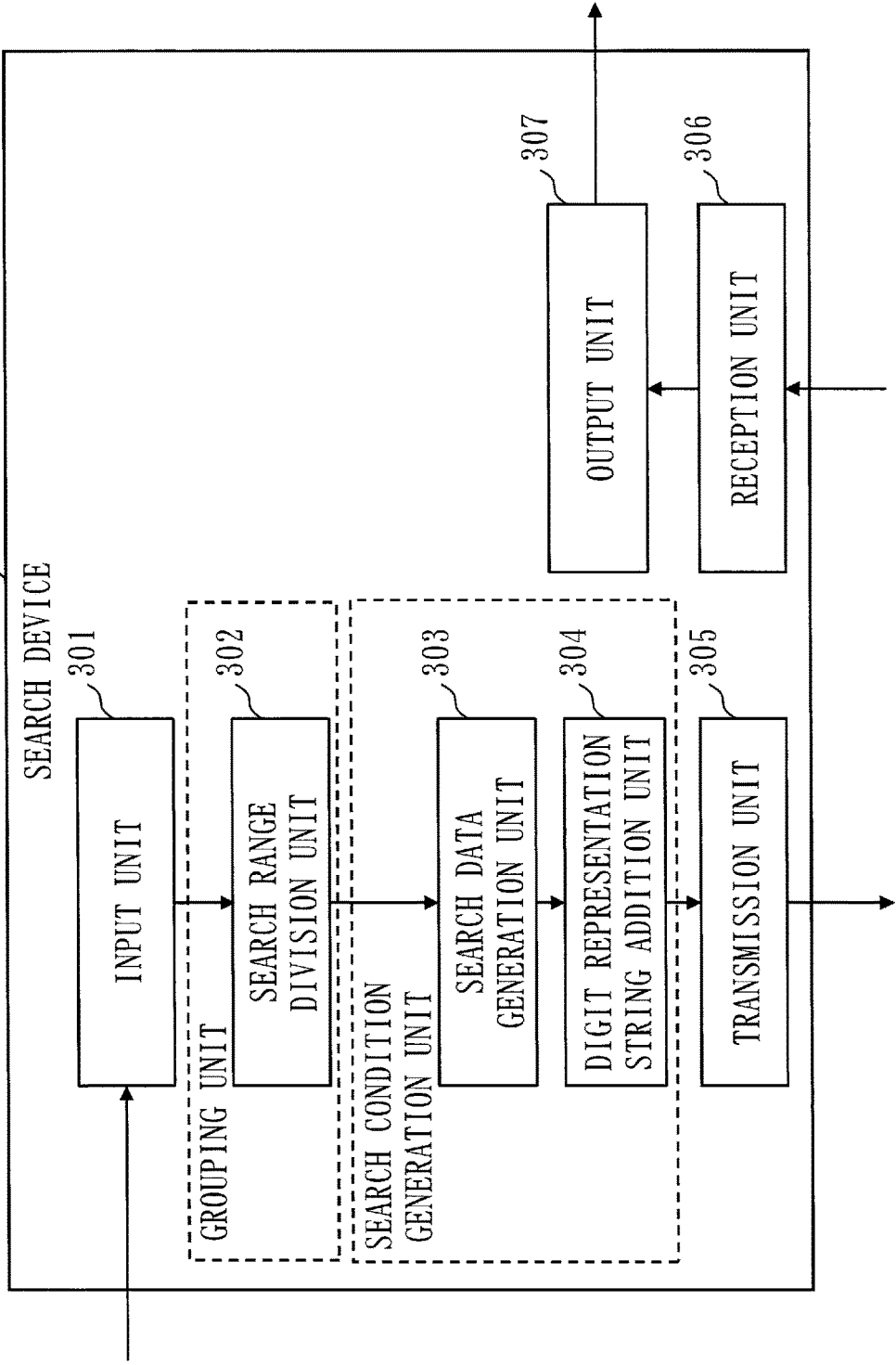
FIG. 3 is a diagram illustrating an example of a functional configuration of a search device according to the first embodiment.

FIG. 3 illustrates an example of a functional configuration of the search device 300.

As illustrated in FIG. 3, the search device 300 has an input unit 301, a search range division unit 302, a search data generation unit 303, a digit representation string addition unit 304, a transmission unit 305, a reception unit 306, and an output unit 307. Note that although not illustrated in FIG. 3, the search device 300 has a recording medium to store data used in the constituent elements of the search device 300, as will be described later.

The input unit 301 acquires search range data s input from a data searcher. The input unit 301 may also receive, together with the search range data, a plurality of storage data names that specify storage data sets to be searched from the data searcher.

Note here that the search range data s is composed of two numerical values $(N_S, N_B)$, where $N_S \leq N_B$.

Each of $N_S$, $N_B$, and numerical values between $N_S$ and $N_B$ is a number sequence of one or more digits. Each of $N_S$, $N_B$, and the numerical values between $N_S$ and $N_B$ corresponds to a search-target numerical value.

The search range division unit 302 calculates numerical values $N_S$, $N_S+1$, $\ldots$, $N_B-1$, and $N_B$ included in the range indicated by the search range data s from the search data s acquired by the input unit 301, and generates a divided range set G by the following procedure.

1. The search range division unit 302 generates a divided range set G which is an empty set.

2. The search range division unit 302 divides $N_S$, $N_S+1$, $N_B-1$, and $N_B$ into groups according to the number of digits, and places a numerical value of one digit in $G_1$, a numerical value of two digits in $G_2$, $\ldots$, and a numerical value of 1 digits in $G_1$.

For example, when $N_S=17$ and $N_B=2121$, $G_1$ is an empty set, $G_2=\{17, 18, \ldots, 99\}$, $G_3=\{100, 101, \ldots, 999\}$, and $G_4=\{1000, 1001, \ldots, 2121\}$.

3. The search range division unit 302 divides the numerical values constituting each $G_a$ ($a=1, \ldots, 1$) into groups according to the value of the most significant digit, and places a numerical value with the most significant digit of 1 in $G_{a1}$, a numerical value with the most significant digit of 2 in $G_{a2}$, $\ldots$, and a numerical value with the most significant digit of 9 in $G_{a9}$. The search range division unit 302 adds a group that is not an empty set and does not include $N_S$ or $N_B$, among $G_{ab}$ (a=1, ..., 1, b=1, ..., 9), to the divided range set G. The search range division unit 302 generates a group including $N_S$ as $G_S$, and generates a group including $N_B$ as $G_B$.

For example, when $N_S$=17 and $N_B$=2121, $G_1$ is an empty set, $G_2$={17, 18, ..., 99}, $G_3$={100, 101, ..., 999}, and $G_4$={1000, 1001, ..., 2121}. Therefore, $G_{11}$ to $G_{19}$ are empty sets. Also note that $G_{21}$={17, 18, 19}, $G_{22}$={20, 21, ..., 29}, ..., $G_{41}$={1000, ..., 1999}, and $G_{42}$={2000, ..., 2121}. The search range division unit 302 adds $G_{22}$ to $G_{41}$ to the divided range set G. Also note that $G_S$=$G_{21}$ and $G_B$=$G_{42}$.

4. The search range division unit 302 sets M=2.
5. The search range division unit 302 divides the numerical values constituting $G_S$ into groups according to the value of the M-th digit from the most significant digit, and adds a group that is not an empty set and does not include $N_S$ to the divided range set G. The search range division unit 302 sets a group including $N_S$ as $G_S$.
6. If $N_S$ is now the only numerical value constituting $G_S$, the search range division unit 302 proceeds to 7 below. If there is, apart from $N_S$, a numerical value constituting $G_S$, the search range division unit 302 sets M=M+1 and returns to 5 above.
7. The search range division unit 302 sets M=2.
8. The search range division unit 302 divides the numerical values constituting $G_B$ into groups according to the value of the M-th digit from the most significant digit, and adds a group that is not an empty set and does not include $N_B$ to the divided range set G. The search range division unit 302 sets a group including $N_B$ as $G_B$.
9. If $N_B$ is now the only numerical value constituting $G_B$, the search range division unit 302 proceeds to 10 below. If there is, apart from $N_B$, a numerical value constituting $G_B$, the search range division unit 302 sets M=M+1 and returns to 8 above.
10. The search range division unit 302 adds $G_B$ and $G_S$ to the divided range set G.

As described above, the search range division unit 302 performs grouping on a plurality of search-target numerical values to be searched for, on a basis of commonality of the number of digits and commonality of a number sequence from the most significant digit, so as to generate one or more numerical value groups. More specifically, the search range division unit 302 extracts search-target numerical values that have the same number of digits and differ only in a number of the least significant digit from the plurality of search-target numerical values, and generates a numerical value group including the extracted search-target numerical values.

The search range division unit 302 corresponds to a grouping unit. The process performed by the search range division unit 302 corresponds to a grouping process.

The search data generation unit 303 generates search data $F_C$ for each group $G_C$ which is an element constituting the divided range set G acquired from the search range division unit 302. The search data $F_C$ indicates a digit and a numerical value that are common to all the numerical values constituting the group $G_C$. Note here that the numerical value data DN constituting the group $G_C$ is represented as $(w_L, ... w_1)$, When the search data $F_C$ is represented using a substring $w_L ... w_j$ representing the numerical value common to all the numerical values constituting the group $G_C$ and position information j of the substring, it is represented as $F_C$=(j, $w_L ... w_j$).

For example, when $G_C$={$w_2$0, $w_2$1, ..., $w_2$9}, the search data $F_C$ is represented as (2, $w_2$). When $G_C$={$w_4w_3$00, ..., $w_4w_3$99}, the search data $F_C$ is represented as (3, $w_4w_3$).

In the following, a set of all pieces of search data $F_C$ will be referred to as a search data set F.

The digit representation string addition unit 304 generates digit-representation-added search data $S_C$ from the search data $F_C$ which is an element constituting the search data set F acquired from the search data generation unit 303, in accordance with substantially the same rule as that of the digit representation string addition unit 204. That is, when the search data $F_C$ is (j, $w_L ... w_j$), the digit representation string addition unit 304 generates (j, $w_L d_L ... w_j d_j$) as the digit-representation-added search data $S_C$.

In the following, a set of all pieces of digit-representation-added search data $S_C$ will be referred to as a digit-representation-added search data set S.

As described above, the search data generation unit 303 and the digit representation string addition unit 304 generate, for each numerical value group, the digit-representation-added search data $S_C$ (corresponding to a search condition element) by establishing a correspondence between a number of each digit ($w_L$, $w_{L+1}$, ..., $w_{j-1}$, $w_j$) of a range ($w_L ... w_j$) of a number sequence that is common to search-target numerical values included in each numerical value group (corresponding to a sequence common range) and the digit representation d of each digit of the range ($w_L ... w_1$).

Then, the digit representation string addition unit 304 generates the digit-representation-added search data set S (corresponding to the search condition) by integrating the digit-representation-added search data $S_C$ of each numerical value group.

The search data generation unit 303 and the digit representation string addition unit 304 correspond to a search condition generation unit. The process performed by the search data generation unit 303 and the digit representation string addition unit 304 corresponds to a search condition generation process.

The transmission unit 305 transmits the digit-representation-added search data set S acquired from the digit representation string addition unit 304 to the management device 400. If a storage data name has also been input together with the search range data from the data searcher, the transmission unit 305 transmits both the digit-representation-added search data set S and the storage data name to the management device 400.

The reception unit 306 receives a search result transmitted from the management device 400.

The output unit 307 outputs, to the data searcher, a message for notifying of the search result received by the reception unit 306.

Figure 4:
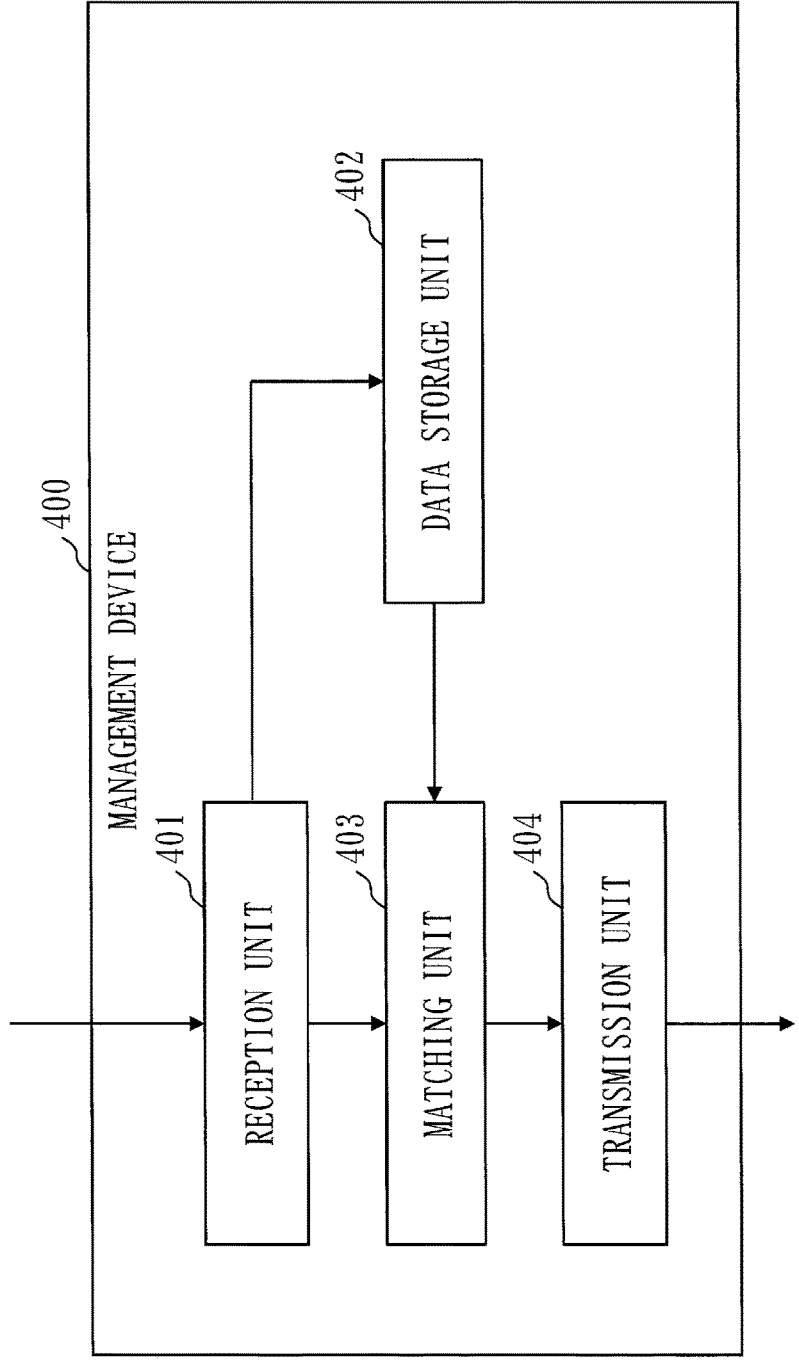
FIG. 4 is a diagram illustrating an example of a functional configuration of a management device according to the first embodiment.

FIG. 4 illustrates an example of a functional configuration of the management device 400. As illustrated in FIG. 4, the management device 400 has a reception unit 401, a data storage unit 402, a matching unit 403, and a transmission unit 404. Note that although not illustrated in FIG. 4, the management device 400 has a recording medium to store data used in the constituent elements of the management device 400, as will be described later.

The reception unit 401 receives the storage data set (ID(D), B(D)) transmitted from the registration device 200 and the digit-representation-added search data set S transmitted from the search device 300. If a storage data name has also been transmitted from the search device 300, the reception unit 401 also receives the storage data name.

The data storage unit 402 stores the storage data set (ID(D), B(D)) acquired from the reception unit 401. The data storage unit 402 may also store a transmission date and time of the storage data set (ID(D), B(D)), if necessary.

The matching unit 403 generates a set R which is an empty set concerning a search result. The matching unit 403 reads all storage data sets (ID(D), B(D)) from the data storage unit 402. Then, the matching unit 403 performs matching as described below, using the digit-representation-added search data set S acquired from the reception unit 401. The matching unit 403 generates the search result.

The matching unit 403 performs matching of the position-information-added substring set B(D) with the digit-representation-added search data $S_C$ included in the digit-representation-added search data set S, for all storage data sets (ID(D), B(D)). Then, the matching unit 403 checks whether the same element as the digit-representation-added search data $S_C$ is included in the position-information-added substring set B(D). If the same element as the digit-representation-added search data $S_C$ is included in the position-information-added substring set B(D), the matching unit 403 adds ID(D) of the position-information-added substring set B(D) concerned to the set R. The set R finally generated as a result of the above process will be referred to as a search result R.

Note that if the reception unit 401 has also received a storage data name, the matching unit 403 reads only the target storage data set (ID(D), B(D)) from the data storage unit 402 based on the storage data name. Then, the matching unit 403 performs the above process only on the storage data set (ID(D), B(D)) that has been read.

The transmission unit 404 transmits the search result R acquired from the matching unit 403 to the search device 300.

An example of a hardware configuration of the registration device 200, the search device 300, and the management device 400 according to the first embodiment will now be described.

Figure 9:
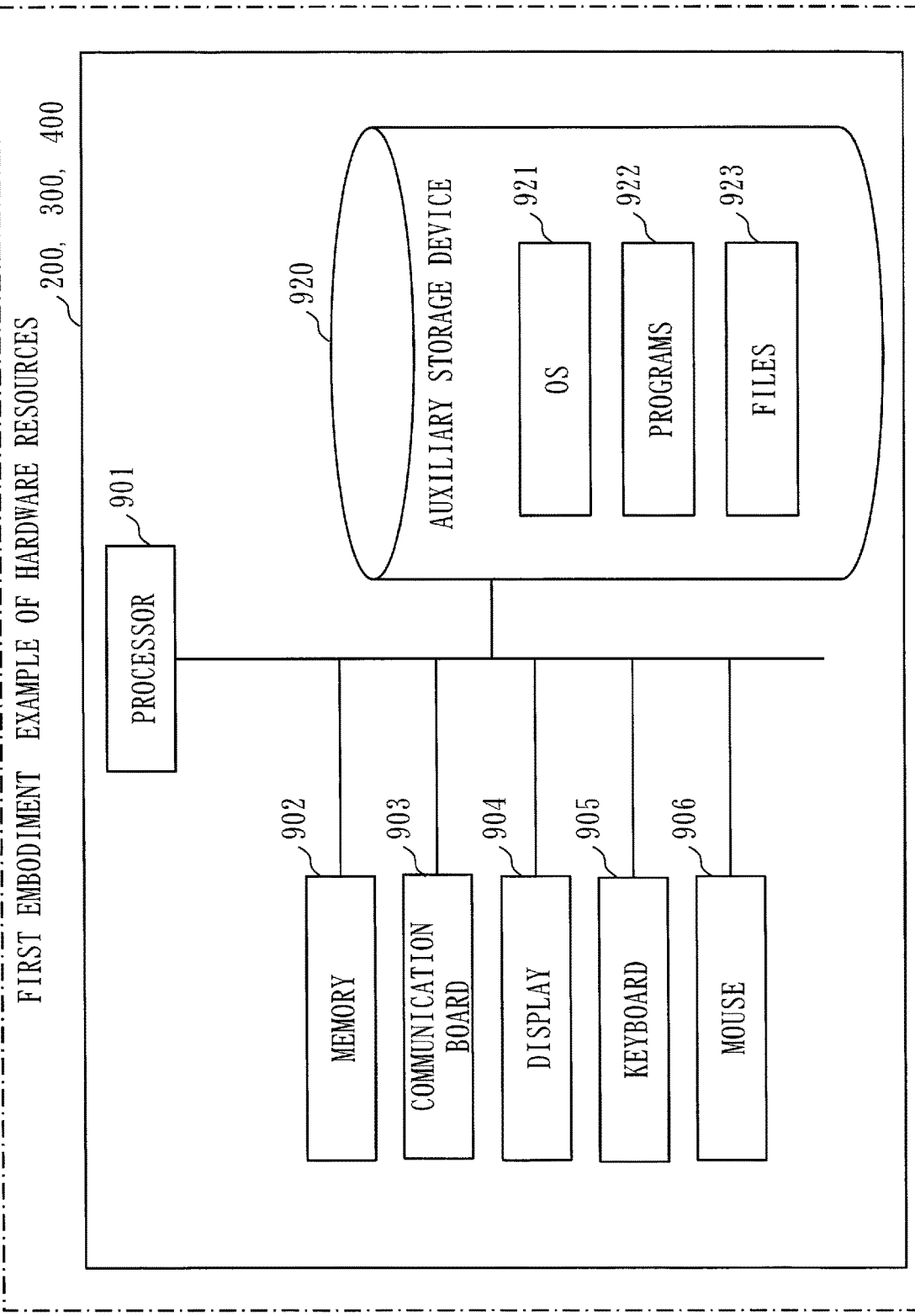
FIG. 9 is a diagram illustrating an example of a hardware configuration of the search system according to the first embodiment.

FIG. 9 illustrates an example of a hardware configuration of the registration device 200, the search device 300, and the management device 400 according to the first embodiment.

With reference to FIG. 9, each of the registration device 200, the search device 300, and the management device 400 has a processor 901.

Each of the registration device 200, the search device 300, and the management device 400 has an auxiliary storage device 920.

The auxiliary storage device 920 stores programs 922. These programs are programs for realizing the functional configuration of each of the registration device 200, the search device 300, and the management device 400.

That is, in the registration device 200, the auxiliary storage device 920 stores the programs for realizing the input unit 201, the numerical value determination unit 202, the data division unit 203, the digit representation string addition unit 204, the substring generation unit 205, the position information assignment unit 206, and the transmission unit 207.

In the search device 300, the auxiliary storage device 920 stores the programs for realizing the input unit 301, the search range division unit 302, the search data generation unit 303, the digit representation string addition unit 304, the transmission unit 305, the reception unit 306, and the output unit 307.

In the management device 400, the auxiliary storage device 920 stores the programs for realizing the reception unit 401, the data storage unit 402, the matching unit 403, and the transmission unit 404.

The programs 922 are loaded into a memory 902 and executed by the processor 901. In the registration device 200, the processor 901 realizes the functions of the input unit 201, the numerical value determination unit 202, the data division unit 203, the digit representation string addition unit 204, the substring generation unit 205, the position information assignment unit 206, and the transmission unit 207 by executing the programs 922.

In the search device 300, the processor 901 realizes the functions of the input unit 301, the search range division unit 302, the search data generation unit 303, the digit representation string addition unit 304, the transmission unit 305, the reception unit 306, and the output unit 307 by executing the programs 922.

In the management device 400, the processor 901 realizes the functions of the reception unit 401, the data storage unit 402, the matching unit 403, and the transmission unit 404 by executing the programs 922.

The auxiliary storage device 920 also stores an operating system (OS) 921. At least part of the OS 921 is executed by the processor 901.

The processor 901 executes the programs 922 while executing at least part of the OS 921.

Executing the OS 921 by the processor 901 causes task management, memory management, file management, communication control, and the like to be performed.

The auxiliary storage device 920 also stores files 923.

The files 923 contain information, data, signal values, or variable values that indicate results of processing. In the auxiliary storage device 920 of each of the registration device 200 and the management device 400, storage data is stored as the files 923. In the auxiliary storage device 920 of the search device 300, search data is stored as the files 923.

A communication board 903 is used to communicate with other devices via the network 101.

A display 904 is used to display various types of information to the user.

A keyboard 905 and a mouse 906 are used to acquire instructions from the user.

Description of Operation

An example of the operation of the search system 100 according to this embodiment will be described below.

Figure 5:
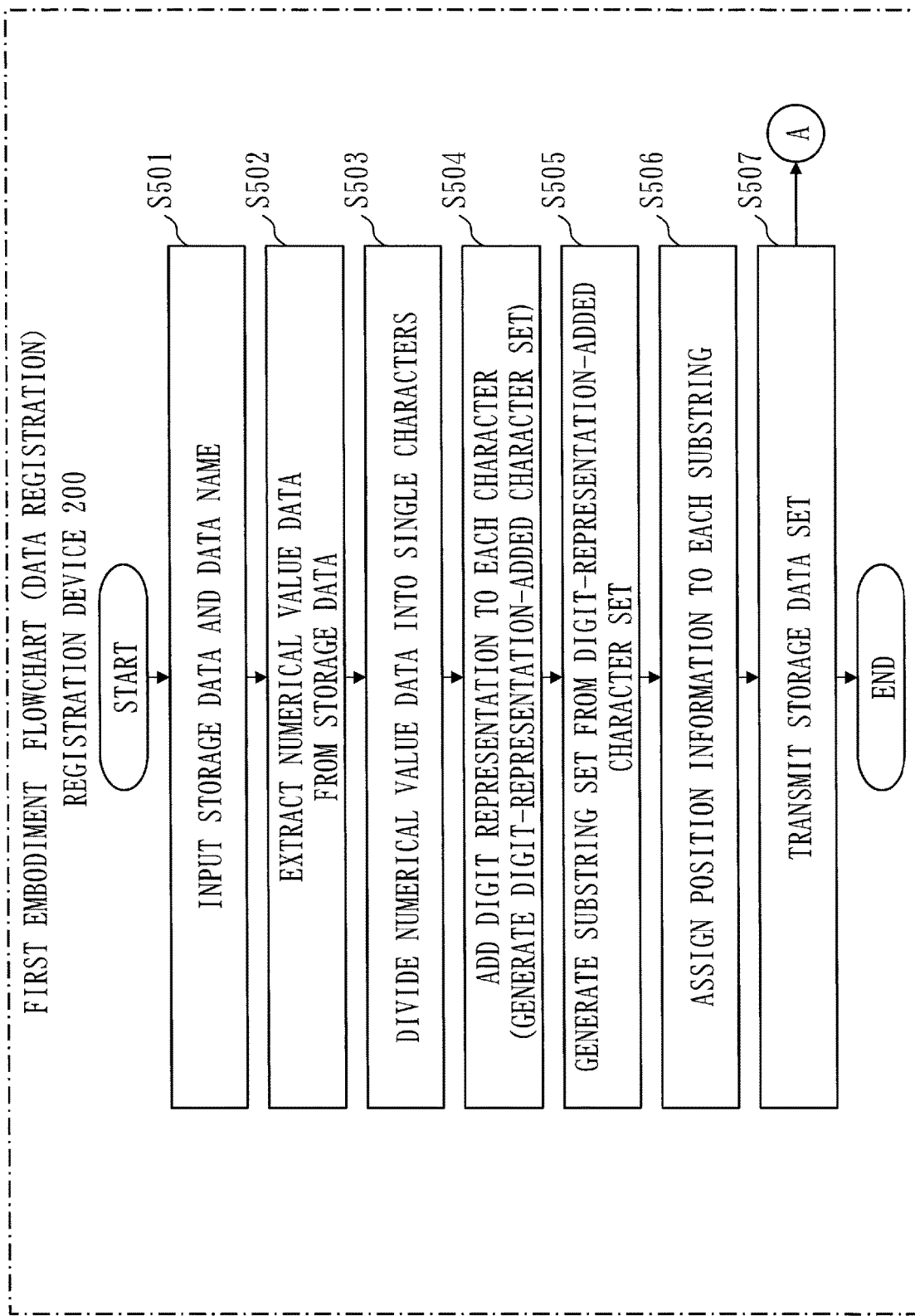
FIG. 5 is a flowchart illustrating a data registration process of the search system according to the first embodiment.
Figure 6:
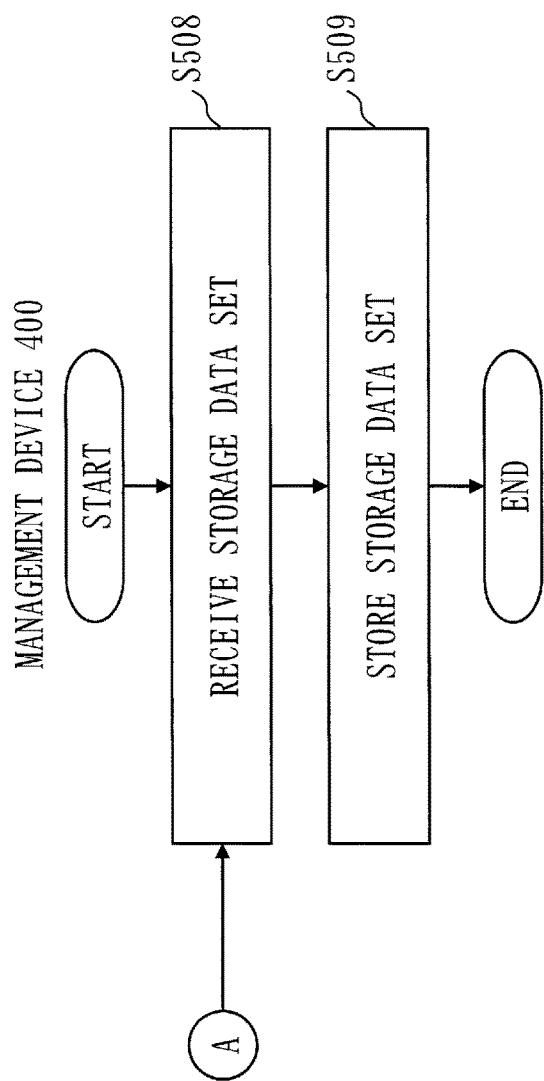
FIG. 6 is a flowchart illustrating the data registration process of the search system according to the first embodiment.

FIGS. 5 and 6 are flowcharts illustrating a registration process of the search system 100.

Steps S501 to S507 of FIG. 5 are a process executed by the registration device 200. Steps S508 to S509 of FIG. 6 are a process executed by the management device 400.

In step S501, the input unit 201 acquires storage data D and a data name ID(D) that are input from a data registrant who is a user. As described above, if no data name is input from the data registrant, the input unit 201 may assign a random number as the data name ID(D) of the input storage data D. Alternatively, the input unit 201 may assign an integer value greater than 0 sequentially as the data name ID(D), so as not to overlap with the data names of other pieces of storage data.

In step S502, the numerical value determination unit 202 determines whether a string that is a number is included in the storage data D acquired from the input unit 201. If a string that is a number is included, the numerical value determination unit 202 extracts the string as numerical value data DN.

In step S503, the data division unit 203 divides the numerical value data DN acquired from the numerical value determination unit 202 as $(w_L, \ldots, w_1)$, where L is the number of characters of the numerical value data DN. Each wi (1≤i≤L) is a number obtained by dividing the numerical value data DN sequentially into single characters.

Note here that wi is called element data. The data division unit 203 divides the numerical value data DN, which is string data, into L pieces of element data $w_L, \ldots, w_1$ from the beginning to the end of the numerical value data DN.

In step S504, the digit representation string addition unit 204 adds a digit representation $(d_1, \ldots, d_L)$, which is a special string representing a digit, to each piece of divided data $(w_L, \ldots, w_1)$ generated in step S503, so as to generate a digit-representation-added character set $(w_L d_L, \ldots, w_1 d_1)$.

In step S505, the substring generation unit 205 generates a substring set A as indicated below from the digit-representation-added character set $(w_L d_L, \ldots, w_1 d_1)$ generated in step S504.

$$A = \{(w_L d_L), (w_L d_L w_{L-1} d_{L-1}), \ldots, (w_L d_L \ldots w_1 d_1)\}$$

In step S506, the position information assignment unit 206 assigns position information, as indicated below, to each substring in the substring set A generated in step S505, so as to generate a position-information-added substring set B(D) for the storage data D, and then generates a storage data set (ID(D), B(D)).

$$B = \{(L, w_L d_L), (L-1, w_L d_L w_{L-1} d_{L-1}), \ldots, (1, w_L d_L \ldots w_1 d_1)\}$$

In step S507, the transmission unit 207 transmits the storage data set (ID(D), B(D)) generated in step S506 to the management device 400.

In step S508, the reception unit 401 receives the storage data set (ID(D), B(D)) transmitted in step S507.

In step S509, the data storage unit 402 stores the storage data set (ID(D), B(D)) received in step S508.

Step S509 completes the registration process of the search system 100.

Figure 7:
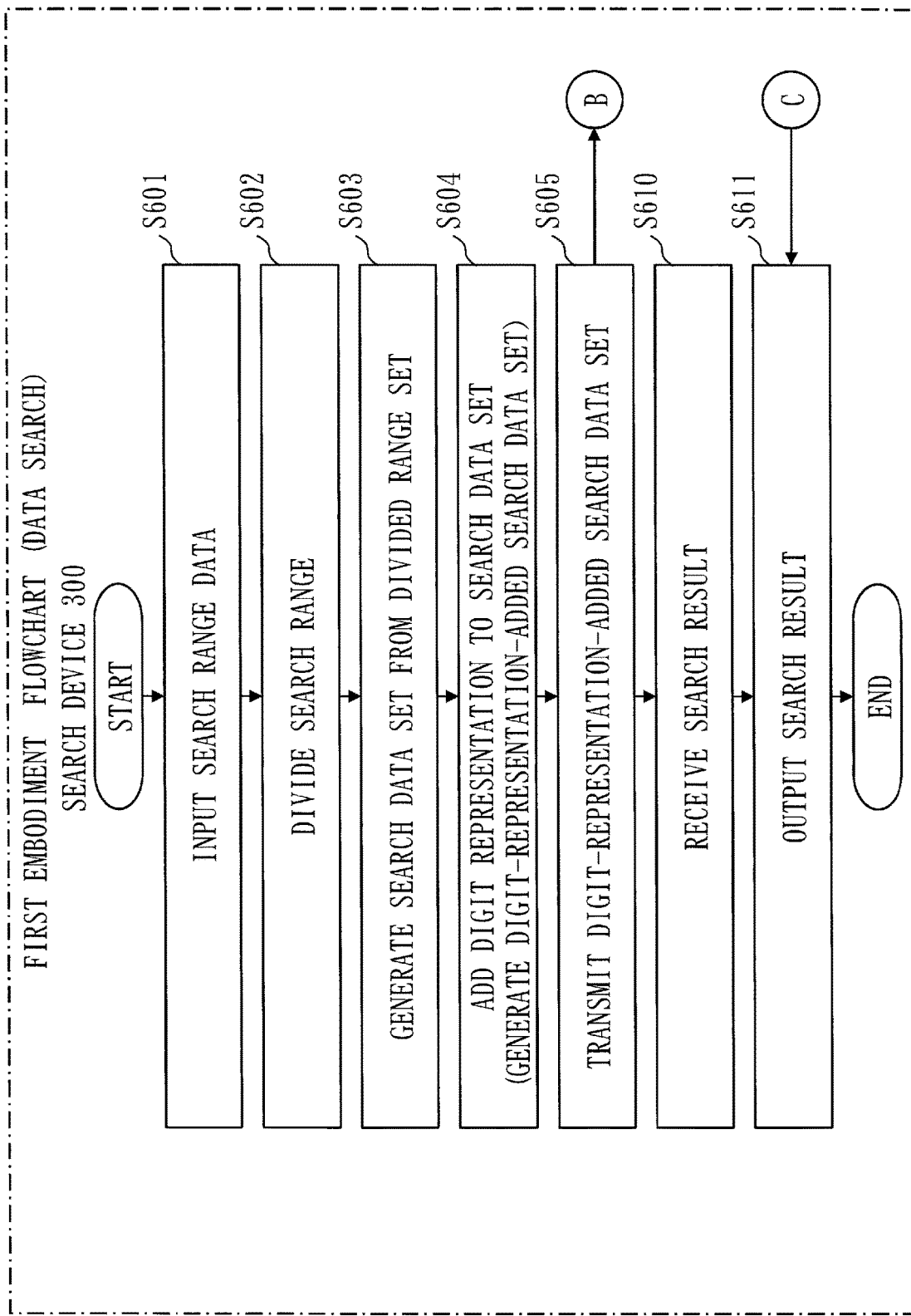
FIG. 7 is a flowchart illustrating a data search process of the search system according to the first embodiment.
Figure 8:
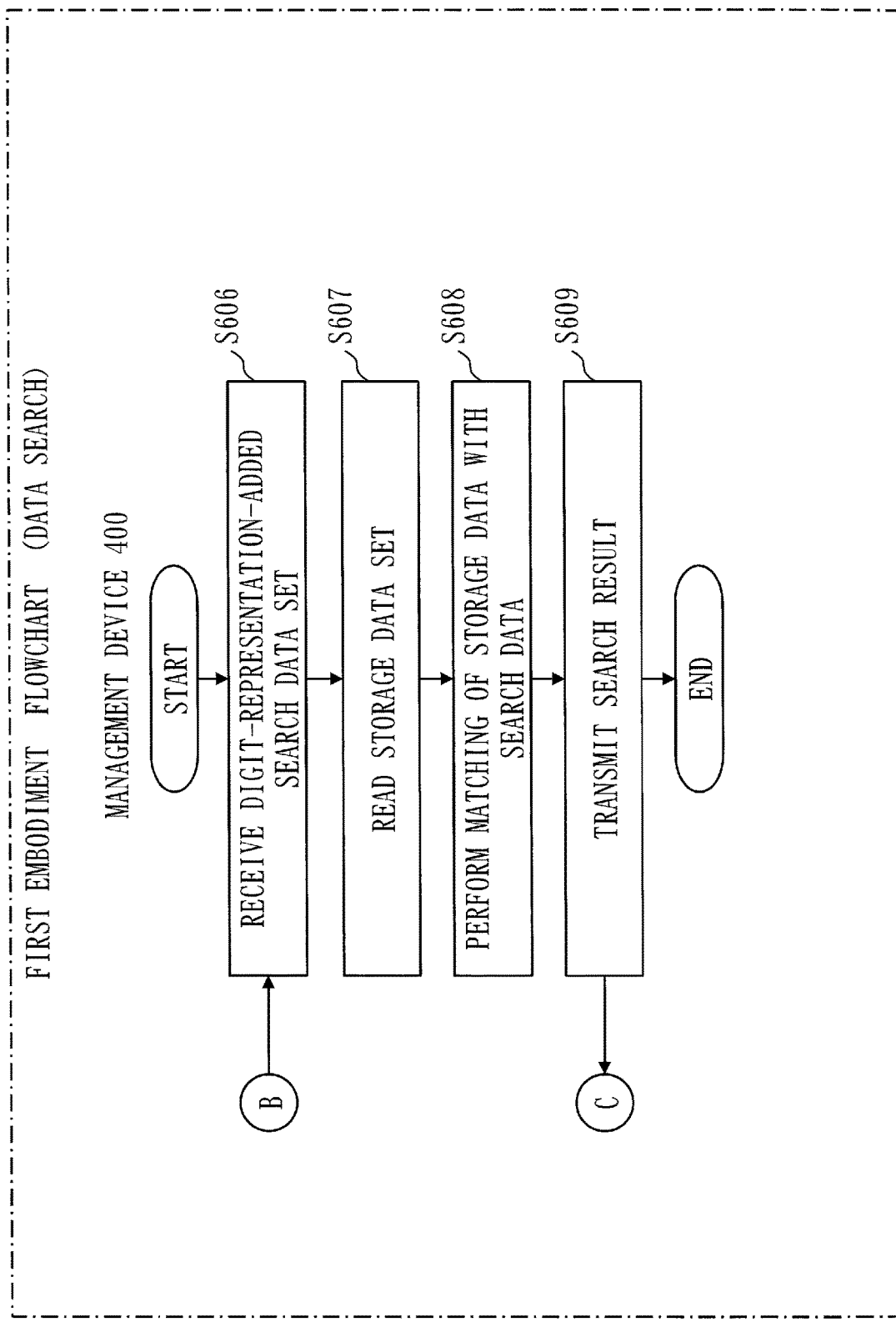
FIG. 8 is a flowchart illustrating the data search process of the search system according to the first embodiment.

FIGS. 7 and 8 are flowcharts illustrating a search process of the search system 100.

Steps S601 to S605 and steps S610 to S611 of FIG. 7 are a process executed by the search device 300. Steps S606 to S609 of FIG. 8 are a process executed by the management device 400.

In step S601, the input unit 301 acquires search range data s input from a data searcher who is a user. Note that the data searcher may input a plurality of pieces of search range data s at the same time. When the data searcher inputs a plurality of pieces of search range data s, the search device 300 performs the subsequent process on each piece of search range data s. As described above, the input unit 301 may acquire, together with the search range data, one or a plurality of storage data names that specify storage data to be searched from the data searcher. Note here that the search range data s is composed of two numerical values $(N_S, N_B)$, where $N_S \leq N_B$.

In step S602, from the search range data s input in step S601, the search range division unit 302 calculates numerical values $N_S, N_S+1, \ldots, N_B-1$, and $N_B$ included in the range indicated by the search range data s and, as described above, generates a divided range set G in the following manner.

1. The search range division unit 302 generates a divided range set G which is an empty set.
2. The search range division unit 302 divides $N_S, N_S+1, \ldots, N_B-1$, and $N_B$ into groups according to the number of digits, and places a numerical value of one digit in $G_1$, a numerical value of two digits in $G_2, \ldots$, and a numerical value of 1 digits in $G_1$.
3. The search range division unit 302 divides the numerical values constituting each $G_a$ (a=1, ..., 1) into groups according to the value of the most significant digit, and places a numerical value with the most significant digit of 1 in $G_{a1}$, a numerical value with the most significant digit of 2 in $G_{a2}, \ldots$, and a numerical value with the most significant digit of 9 in $G_{a9}$. Then, the search range division unit 302 adds a group that is not an empty set and does not include $N_S$ or $N_B$, among $G_{ab}$ (a=1, ..., 1, b=1, ..., 9), to the divided range set G. The search range division unit 302 generates a group including $N_S$ as $G_S$ and generates a group including $N_B$ as $G_B$.
4. The search range division unit 302 sets M=2.
5. The search range division unit 302 divides the numerical values constituting $G_S$ into groups according to the value of the M-th digit from the most significant digit, and adds a group that is not an empty set and does not include $N_S$ to the divided range set G. The search range division unit 302 sets a group including $N_S$ as $G_S$.
6. If $N_S$ is now the only numerical value constituting $G_S$, the search range division unit 302 proceeds to 7 below. If there is, apart from $N_S$, a numerical value constituting $G_S$, the search range division unit 302 sets M=M+1 and returns to 5 above.
7. The search range division unit 302 sets M=2.
8. The search range division unit 302 divides the numerical values constituting $G_B$ into groups according to the value of the M-th digit from the most significant digit, and adds a group that is not an empty set and does not include $N_B$ to the divided range set G. The search range division unit 302 sets a group including $N_B$ as $G_B$.
9. If $N_B$ is now the only numerical value constituting $G_B$, the search range division unit 302 proceeds to 10 below. If there is, apart from $N_B$, a numerical value constituting $G_B$, the search range division unit 302 sets M=M+1 and returns to 8 above.
10. The search range division unit 302 adds $G_B$ and $G_S$ to the divided range set G.

In step S603, the search data generation unit 303 generates search data $F_C$ for each group $G_C$ which is an element constituting the divided range set G generated in step S602. As described above, the search data $F_C$ indicates a digit and a numerical value that are common to all the numerical values constituting the group $G_C$. Note here that the numerical value data DN constituting the group $G_C$ is represented as $(w_L, \ldots, w_1)$. When the search data $F_C$ is represented using a substring $w_L \ldots w_3$ representing a numerical value common to all the numerical values constituting the group $G_C$ and position information j of the substring, it is represented as $F_C = (j, w_L, \ldots w_j)$.

As described above, the set of all pieces of search data $F_C$ is referred to as the search data set F.

In step S604, the digit representation string addition unit 304 generates digit-representation-added search data $S_C$ from the search data $F_C$ which is an element constituting the search data set F generated in step S603, in accordance with substantially the same rule as that of the digit representation string addition unit 204. That is, when the search data $F_C$ is $(j, w_L \ldots w_j)$, the digit representation string addition unit 304 generates $(j, w_L d_L \ldots w_j d_j)$ as the digit-representation-added search data $S_C$.

As described above, the set of all pieces of digit-representation-added search data $S_C$ is referred to as the digit-representation-added search data set S.

In step S605, the transmission unit 305 transmits the digit-representation-added search data set S generated in step S604 to the management device 400. If a storage data name has also been input together with the search range data from the data searcher, both the digit-representation-added search data set S and the storage data name are transmitted to the management device 400.

In step S606, the reception unit 401 receives the digit-representation-added search data set S transmitted in step S605. If the storage data name has been transmitted, the reception unit 401 also receives the storage data name.

In step S607, the matching unit 403 reads all storage data sets (ID(D), B(D)) from the data storage unit 402. Note that if the reception unit 401 has received the storage data name in step S606, the matching unit 403 reads only a storage data set corresponding to the storage data name. If the reception unit 401 has not received the storage data name in step S606, the matching unit 403 reads all the stored storage data sets.

In step S608, the matching unit 403 generates a set R which is an empty set concerning a search result. The matching unit 403 also performs matching as described below, based on the storage data sets (ID(D), B(D)) read in step S607 and the digit-representation-added search data set S acquired from the reception unit 401. Then, the matching unit 403 generates the search result.

The matching unit 403 performs matching of the position-information-added substring set B(D) with the digit-representation-added search data $S_C$ included in the digit-representation-added search data set S, for all the storage data sets (ID(D), B(D)). Then, the matching unit 403 checks whether the same element as the digit-representation-added search data $S_C$ is included in the position-information-added substring set B(D). If the same element as the digit-representation-added search data $S_C$ is included in the position-information-added substring set B(D), the matching unit 403 adds ID(D) of the position-information-added substring set B(D) concerned to the set R. The set R finally generated as a result of the above process is referred to as the search result R.

In step S609, the transmission unit 404 transmits the search result R generated in step S608 to the search device 300.

In step S610, the reception unit 306 receives the search result R transmitted in step S609.

In step S611, the output unit 307 outputs, to the data searcher, a message for notifying of the search result based on the search result received in step S610.

The operation of the search system according to this embodiment will be described below using specific examples.

In the following, it is assumed that
storage data D1=123A,
ID(D1)=1,
storage data D2=B12,
ID(D2)=2,
search range data s=(28, 125), and
digit representations $(d_1, d_2, d_3)=(\alpha, \beta, \gamma)$.

First, the registration process of the storage data D1 and the storage data D2 will be described.

In step S502, the numerical value determination unit 202 determines that the storage data D1 includes numerical value data DN1=123, and determines that the storage data D2 includes numerical value data DN2=12.

In step S503, the data division unit 203 divides the numerical value data DN1 as DN1={1, 2, 3}, and divides the numerical value data DN2 as DN2={1, 2}.

In step S504, the digit representation string addition unit 204 generates a digit-representation-added string data set S1={1γ, 2β, 3α} and a digit-representation-added string data set S2={1β, 2α}.

In step S505, the substring generation unit 205 generates A1={1γ, 1γ2β, 1γ2β3α} and A2={1β, 1β2α}.

In step S506, the position information assignment unit 206 generates B(D1)={(3, 1γ), (2, 1γ2β), (1, 1γ2β3α)} and B(D2)={(2, 1β), (1, 1β2α)}. The position information assignment unit 206 also generates a storage data set (1, B(D1)) and a storage data set (2, B(D2)).

In step S508, the reception unit 401 of the management device 400 receives the storage data sets (1, B(D1)) and (2, B(D2)).

Then, in step S509, the data storage unit 402 stores the storage data sets (1, B(D1)) and (2, B(D2)).

Next, the search process when the search range data s is s=(28, 125) will be described.

In step S602, the search range division unit 302 generates a divided range set G by the following process.

Since $N_S$=28 and $N_B$=125 from s=(28, 125), the search range division unit 302 generates an empty set $G_1$. The search range division unit 302 also generates $G_2$={28, . . . , 99} and $G_3$={100, . . . , 125}.

The search range division unit 302 also generates an empty set $G_{21}$. The search range division unit 302 also generates $G_{22}$={28, 29}, . . . , $G_{29}$={90, . . . , 99}, and $G_{31}$={100, . . . , 125}.

Note here that $G_{22}$ includes $N_S$ and $G_{31}$ includes $N_B$. Therefore, G={$G_{23}$, . . . , $G_{29}$}.

Next, the search range division unit 302 sets M=2.

Therefore, the search range division unit 302 performs grouping on $G_{22}$ according to the value of the second digit from the most significant digit. As a result, $G_{22}$ is divided into groups {28} and {29}. Then, {29} is added to G.

Since {28} is a group constituted only by $N_S$ (=28), {28} is also added to G.

Therefore, G={$G_{23}$, . . . , $G_{29}$, {28}, {29}} is obtained.

Likewise, the search range division unit 302 sets M=2.

Therefore, the search range division unit 302 performs grouping on $G_{31}$ according to the value of the second digit from the most significant digit. As a result, $G_{31}$ is divided into groups $G_{310}$=100, . . . , 1091, $G_{311}$={110 . . . , 119}, and $G_{312}$={121, . . . , 125}.

Note here that $G_{312}$ is a group including $N_B$ (=125). Therefore, $G_{310}$ and $G_{311}$ are added to G.

Accordingly, G={$G_{23}$, . . . , $G_{29}$, {28}, {29}, $G_{310}$, $G_{311}$} is obtained.

Then, the search range division unit 302 sets M=2+1=3.

Therefore, the search range division unit 302 performs grouping on $G_{312}$ according to the value of the third digit from the most significant digit. As a result, $G_{312}$ is divided into groups {121}, {122}, {123}, {124}, and {125}. Then, {121}, {122}, {123}, and {124} are added to G.

Since {125} is a group constituted only by $N_B$ (=125), {125} is also added to G.

Accordingly, G={$G_{23}$, . . . , $G_{29}$, {28}, {29}, $G_{310}$, $G_{311}$, {121}, {122}, {123}, {124}, {125}} is obtained.

In step S603, the search data generation unit 303 generates a search data set F from the divided range set G by the following process.

As described above, G={$G_{23}$, . . . , $G_{29}$, {28}, {29}, $G_{310}$, $G_{311}$, {121}, {122}, {123}, {124}, {125}} has been obtained.

The search data generation unit 303 generates $F_{23}$ from $G_{23}$ as described below.

Since $G_{23}$={30, 31, . . . , 39}, the values constituting $G_{23}$ can be represented as $3w_1$. That is, j=2 and $w_2$=3.

Therefore, the search data generation unit 303 generates $F_{23}$=(2, 3).

Similarly, the search data generation unit 303 generates $F_{24}$ to $F_{29}$ from $G_{24}$ to $G_{29}$ as indicated below.

$F_{24}=(2, 4)$, $F_{25}=(2, 5)$, $F_{26}=(2, 6)$, $F_{27}=(2, 7)$, $F_{28}=(2, 8)$, $F_{29}=(2, 9)$

The search data generation unit 303 also generates $F_{310}$ and $F_{311}$ from $G_{310}$ and $G_{311}$ as indicated below.

That is, $G_{310}=\{100, 101, \ldots, 109\}$ and $G_{311}=\{110, 111, \ldots, 119\}$. Therefore, the values constituting $G_{310}$ can be represented as $10w_1$, and $j=2$ and $w_3w_2=10$. The values constituting $G_{311}$ can be represented as $11w_1$, and $j=2$ and $w_3w_2=11$.

Therefore, the search data generation unit 303 generates $F_{310}=(2, 10)$ and $F_{311}=(2, 11)$.

The search data generation unit 303 also generates (1, 28), (1, 29), (1, 121), . . . , and (1, 125) as search data from $\{28\}$, $\{29\}$, $\{121\}$, . . . , and $\{125\}$.

Accordingly, the search data generation unit 303 generates $F=\{(2, 3), \ldots, (2, 9), (2, 10), (2, 11), (1, 28), (1, 29), (1, 121), \ldots, (1, 125)\}$.

In step S604, the digit representation string addition unit 304 generates a digit-representation-added search data set S from the search data set F by the following process.

Since $(d_1, d_2, d_3)=(A, B, C)$, the digit representation string addition unit 304 generates $S=\{(2, 3B), \ldots, (2, 9B), (2, 1C0B), (2, 1C1B), (1, 2B8A), (1, 2B9A), (1, 1C2B1A), \ldots, (1, 1C2B5A)\}$.

In step S607, the matching unit 403 reads (1, B(D1)) and (2, B(D2)).

In step S608, the matching unit 403 checks whether an element of the digit-representation-added search data set S is included in B(D1) and B(D2).

In this example, (1, 1C2B3A) is included in B(D1) and no element of S is included in B(D2).

Thus, since ID(D1)=1, the matching unit 403 generates the search result R={1}.

In step S611, the output unit 307 outputs a message such as "data of the storage data name "1" includes a numerical value matching the search condition", based on the search result R.

Description of Effects of Embodiment

According to this embodiment, the following effects can be obtained, for example.

(1) According to this embodiment, a numerical value is extracted from storage data at the time of the registration process. Thus, it is not necessary to extract a numerical value from the storage data in the search process, so that the search speed can be enhanced.

(2) According to this embodiment, digit representations are added to both storage data and search data. Thus, it is possible to avoid a situation in which a numerical value partially matching a search condition but not satisfying the search condition is included in a search result. According to this embodiment, for example, when 10 is specified as the search condition, it is possible to avoid a situation in which 100, 210, or the like is included in a search result. Therefore, according to this embodiment, accurate search results can be obtained.

(3) According to this embodiment, digit representations are added to both storage data and search data. Thus, search conditions for a plurality of numerical values can be integrated into one piece of search data. According to this embodiment, for example, search conditions for 10 to 19 can be integrated into one piece of search data as 1B. Therefore, according to this embodiment, it is possible to prevent an increase in search time due to an increase in the number of times of searching.

Second Embodiment

This embodiment describes an example in which a searchable encryption technique is applied to the procedures described in the first embodiment.

In this embodiment, differences from the first embodiment will be mainly described.

Matters not described below are substantially the same as in the first embodiment.

Description of Configuration

Figure 10:
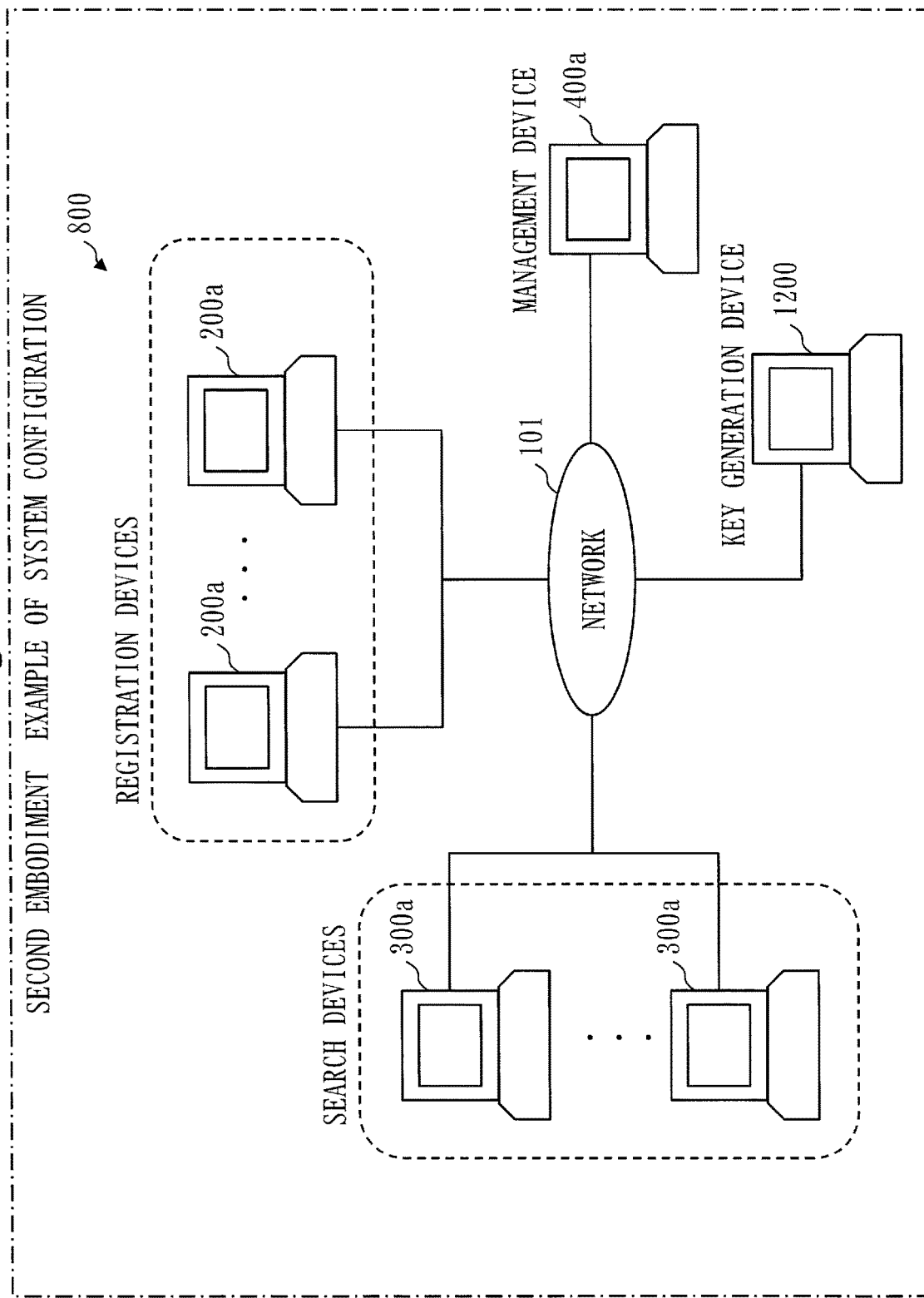
FIG. 10 is a diagram illustrating a configuration of a search system according to a second embodiment.

FIG. 10 illustrates an example of a configuration of a search system 800 according to this embodiment.

As illustrated in FIG. 10, the search system 800 according to this embodiment includes a plurality of registration devices 200*a*, a plurality of search devices 300*a*, a management device 400*a*, and a key generation device 1200.

The search system 800 may include only one registration device 200*a*. The search system 800 may include only one search device 300*a*. The search system 800 may include a plurality of management devices 400*a*. The search system 800 may include a plurality of key generation devices 1200. A network 101 is a communication channel to connect the plurality of registration devices 200*a*, the plurality of search devices 300*a*, the management device 400*a*, and the key generation device 1200. As described in the first embodiment, the network 101 is, for example, the Internet or a LAN installed in a company.

The registration device 200*a* is, for example, a personal computer. The registration device 200*a* is a computer that operates as a registration terminal to register storage encrypted data in the management device 400*a*. The registration device 200*a* generates storage encrypted data, and requests the management device 400*a* to store the storage encrypted data.

The search device 300*a* is, for example, a personal computer. The search device 300*a* is a computer that transmits search encrypted data to the management device 400*a*, then receives a search result from the management device 400*a*, and outputs the search result. The search device 300*a* transmits search encrypted data to the management device 400*a*, and requests matching of the storage encrypted data with the search encrypted data. The search device 300*a* outputs a search result returned from the management device 400*a*.

The management device 400*a* has a large-capacity recording medium to store storage encrypted data generated by the registration device 200*a*. When storage of storage encrypted data is requested by the registration device 200, the management device 400*a* stores the storage encrypted data. When a search is requested by the search device 300*a*, the management device 400*a* performs matching of the storage encrypted data with the search encrypted data, and transmits a search result to the search device 300*a*.

The key generation device 1200 generates a key used for encryption. Then, the key generation device 1200 transmits the key to the plurality of registration devices 200*a* and the plurality of search devices 300*a* via the network 101. Note that instead of via the network 101, the key may be distributed directly to the plurality of registration devices 200*a* and the plurality of search devices 300*a* by mail or the like.

Note that the registration device 200a and the search device 300a may be included together in the same personal computer.

Note that both the storage encrypted data and the search encrypted data have been encrypted. Except for the registration device 200a and the search device 300a that have the key, it is not possible to obtain useful information from the storage encrypted data and the search encrypted data.

Configurations of this embodiment will be described below.

As illustrated in FIG. 10, the search system 800 includes the registration device 200a, the search device 300a, the management device 400a, and the key generation device 1200.

A configuration of the registration device 200a, a configuration of the search device 300a, a configuration of the management device 400a, and a configuration of the key generation device 1200 will be described below in this order.

Figure 11:
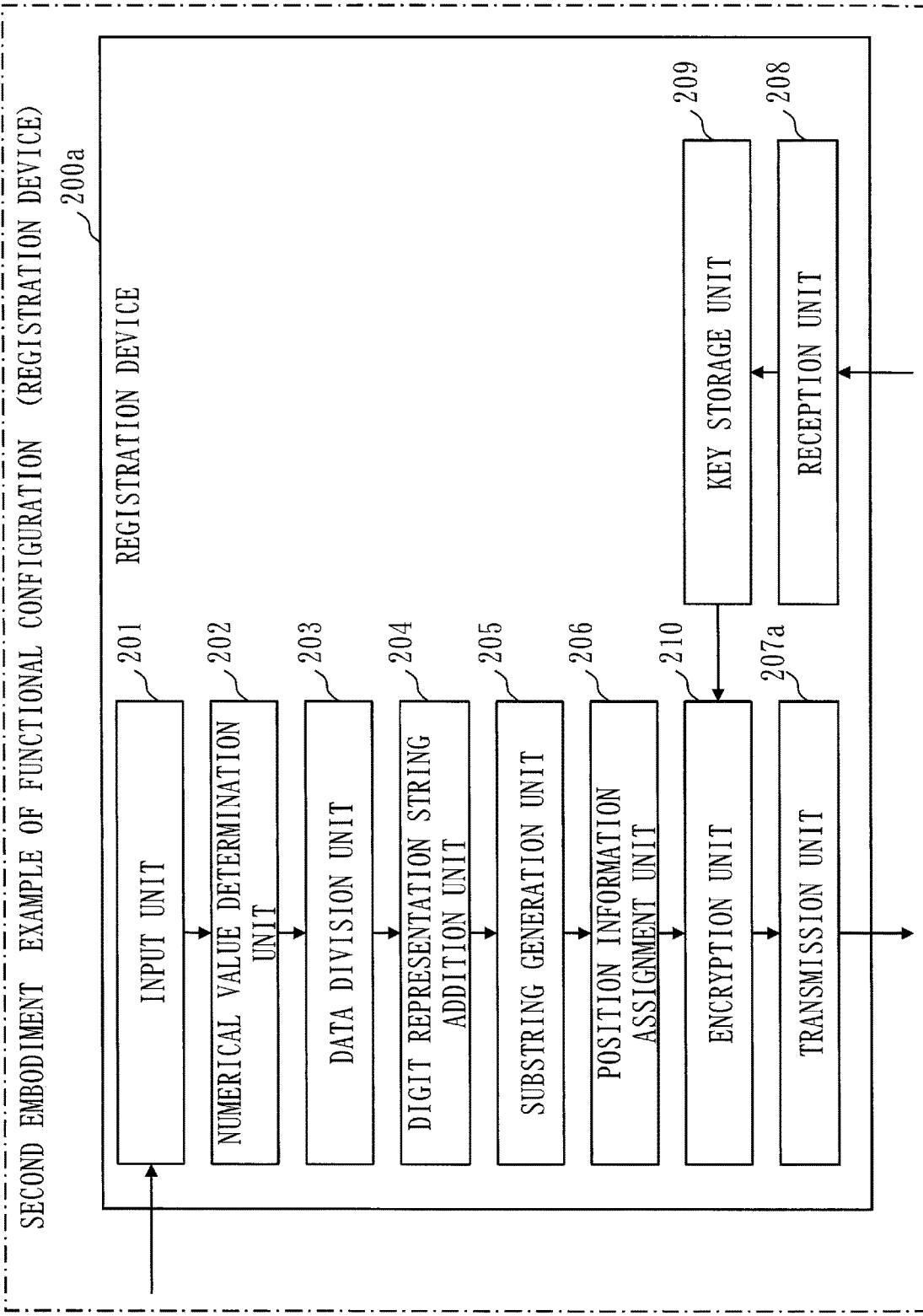
FIG. 11 is a diagram illustrating an example of a functional configuration of a registration device according to the second embodiment.

FIG. 11 illustrates an example of a functional configuration of the registration device 200a. As illustrated in FIG. 11, the registration device 200a has an input unit 201, a numerical value determination unit 202, a data division unit 203, a digit representation string addition unit 204, a substring generation unit 205, a position information assignment unit 206, a transmission unit 207a, a reception unit 208, a key storage unit 209, and an encryption unit 210. Note that although not illustrated in FIG. 11, the registration device 200a has a recording medium to store data used in the constituent elements of the registration device 200a.

The input unit 201, the numerical value determination unit 202, the data division unit 203, the digit representation string addition unit 204, the substring generation unit 205, and the position information assignment unit 206 are the same as those described in the first embodiment, and thus description of these elements will be omitted.

The reception unit 208 receives a key K transmitted from the key generation device 1200.

The key storage unit 209 stores the key K received by the reception unit 208.

The encryption unit 210 reads the key K from the key storage unit 209. The encryption unit 210 generates a ciphertext C for each position-information-added substring in a position-information-added substring set B acquired from the position information assignment unit 206 in the following manner. That is, the encryption unit 210 generates the ciphertext C for each pair (p, w) of position information and a substring by $C=E(E(K, w), p, ID(D))$. Note that E is an encryption function. The encryption unit 210 generates the ciphertext C using, for example, a common-key cryptographic scheme such as the Advanced Encryption Standard (AES), a message authentication code such as the Hash-based Message Authentication Code (HMAC), or a hash function such as Secure Hash Algorithm (SHA)-256.

In the following, a set of ciphertexts for all (i, w) will be referred to as storage encrypted data C(D). In the following, a pair (ID(D), C(D)) will be referred to as a storage encrypted data set.

The transmission unit 207a transmits the storage encrypted data set (ID(D), C(D)) acquired from the encryption unit 210 to the management device 400a.

Figure 12:
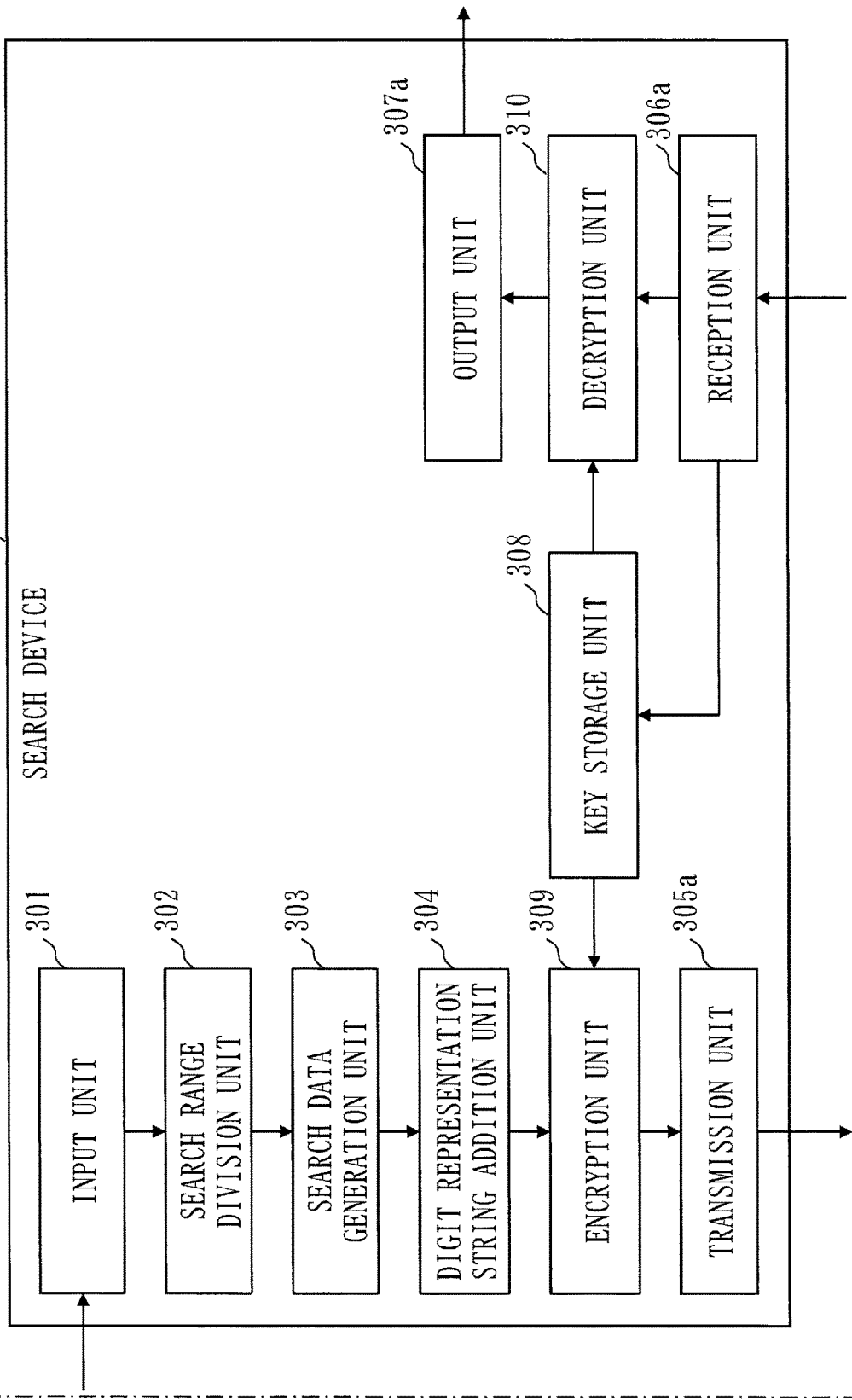
FIG. 12 is a diagram illustrating an example of a functional configuration of a search device according to the second embodiment.

FIG. 12 illustrates an example of a functional configuration of the search device 300a.

As illustrated in FIG. 12, the search device 300a has an input unit 301, a search range division unit 302, a search data generation unit 303, a digit representation string addition unit 304, a transmission unit 305a, a reception unit 306a, an output unit 307a, a key storage unit 308, an encryption unit 309, and a decryption unit 310. Note that although not illustrated in FIG. 12, the search device 300a has a recording medium to store data used in the constituent elements of the search device 300a.

The input unit 301, the search range division unit 302, the search data generation unit 303, and the digit representation string addition unit 304 are the same as those described in the first embodiment, and thus description of these elements will be omitted.

The encryption unit 309 generates search encrypted data Qc, using the key K, for each piece of digit-representation-added search data Sc in a digit-representation-added search data set S acquired from the digit representation string addition unit 304 in the following manner. That is, the encryption unit 309 generates the search encrypted data Qc by $Qc=E(K, Sc)$.

In the following, a set of search encrypted data obtained by encrypting all pieces of digit-representation-added search data Sc included in the digit-representation-added search data set S will be referred to as a search encrypted data set Q(S).

The transmission unit 305a transmits the search encrypted data set Q(S) acquired from the encryption unit 309 to the management device 400a. If a storage data name has also been input together with the search data from the data searcher, the transmission unit 305a transmits both the search encrypted data set Q(S) and the storage data name to the management device 400a.

The reception unit 306a receives the key K transmitted from the key generation device 1200 or a search result transmitted from the management device 400a.

The key storage unit 308 stores the key K acquired from the reception unit 306a.

When the search result acquired from the reception unit 306a has been encrypted, the decryption unit 310 decrypts the search result using the key K stored in the key storage unit 308.

The output unit 307a outputs, to the data searcher, a message for notifying of the search result acquired from the decryption unit 310.

Figure 13:
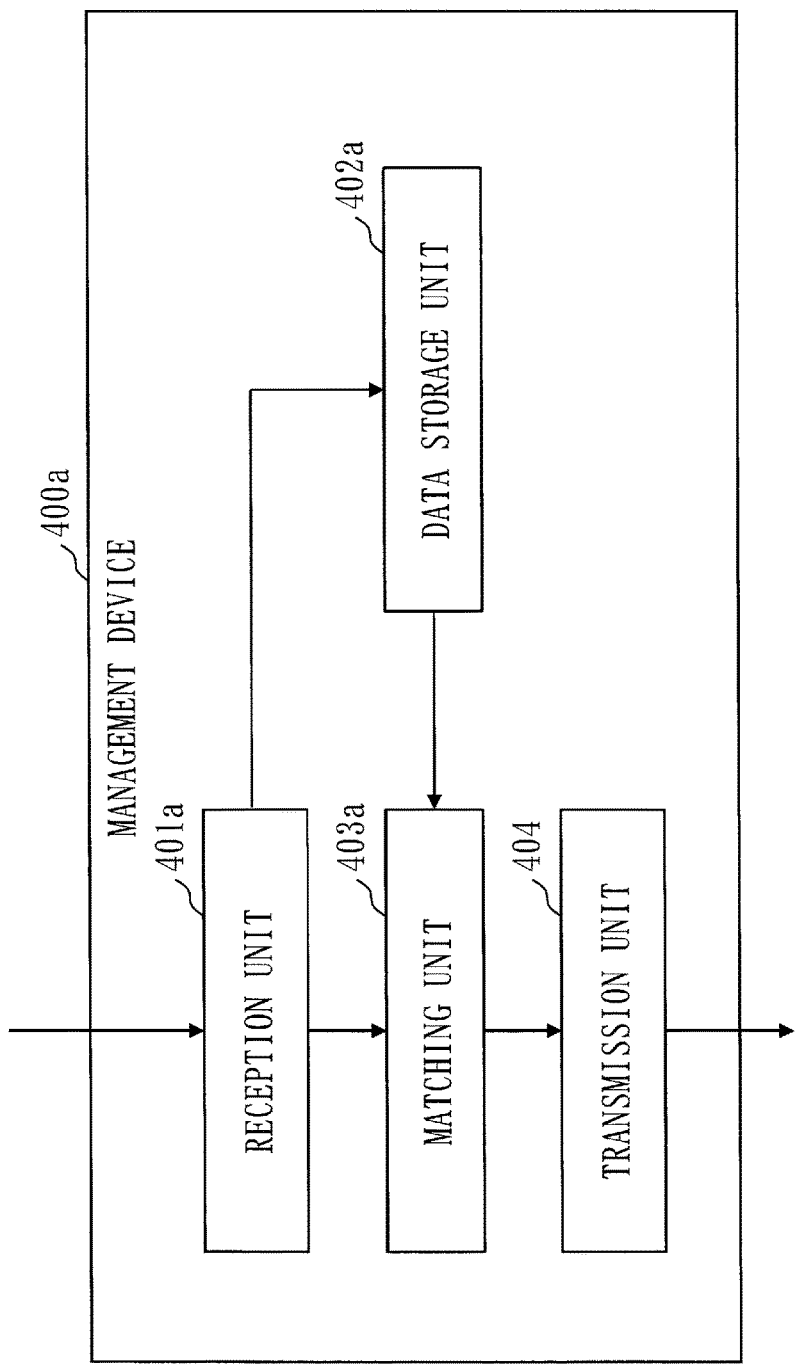
FIG. 13 is a diagram illustrating an example of a functional configuration of a management device according to the second embodiment.

FIG. 13 illustrates an example of a functional configuration of the management device 400a.

As illustrated in FIG. 13, the management device 400a has a reception unit 401a, a data storage unit 402a, a matching unit 403a, and a transmission unit 404. Note that although not illustrated in FIG. 13, the management device 400a has a recording medium to store data used in the constituent elements of the management device 400a.

The reception unit 401a receives the storage encrypted data set (ID(D), C(D)) transmitted from the registration device 200a and the search encrypted data set Q(S) transmitted from the search device 300a. If a storage data name has been transmitted from the search device 300a, the reception unit 401a also receives the storage data name.

The data storage unit 402a stores the storage encrypted data set (ID(D), C(D)) acquired from the reception unit 401a. The data storage unit 402 may also store a transmission date and time of the storage encrypted data set (ID(D), C(D)), if necessary.

The matching unit 403a generates a set R which is an empty set R concerning a search result. The matching unit 403a reads all storage encrypted data sets (ID(D), C(D)) from the data storage unit 402a. Then, the matching unit 403a performs matching as described below, using the search encrypted data set Q(S) acquired from the reception unit 401a. The matching unit 403a generates the search result.

The matching unit 403a generates matching data Tp for ID(D) from each element Qc of the search encrypted data set Q(S), for all the storage encrypted data sets (ID(D), C(D)). Specifically, the matching unit 403a generates each piece of matching data Tp by T1=E(Qc, 1, ID(D)), TL=E(Qc, L, ID(D)). When there are a plurality of storage encrypted data sets (ID(D), C(D)), the matching unit 403a generates matching data corresponding to each ID(D).

The matching unit 403a checks whether each generated piece of matching data Tp ($1 \le p \le L$) is included in the storage encrypted data C(D). If each piece of matching data Tp is included in the storage encrypted data C(D), the matching unit 403a adds the pair (ID(D), p) to the set R. When a plurality of sets of matching data Tp have been generated to correspond to a plurality of storage encrypted data sets (ID(D), C(D)), the matching unit 403a adds pairs concerning the search result described above to the same set R, individually for each set of matching data Tp. The set R finally generated as a result of the above process is referred to as a search result R.

Note that if the reception unit 401a has also received a storage data name, the matching unit 403a reads only the target storage encrypted data set (ID(D), C(D)) from the data storage unit 402a based on the storage data name. Then, the matching unit 403 performs the above process only on the storage encrypted data set (ID(D), C(D)) that has been read.

The transmission unit 404 is the same as that described in the first embodiment, and thus description of the transmission unit 404 will be omitted.

Figure 14:
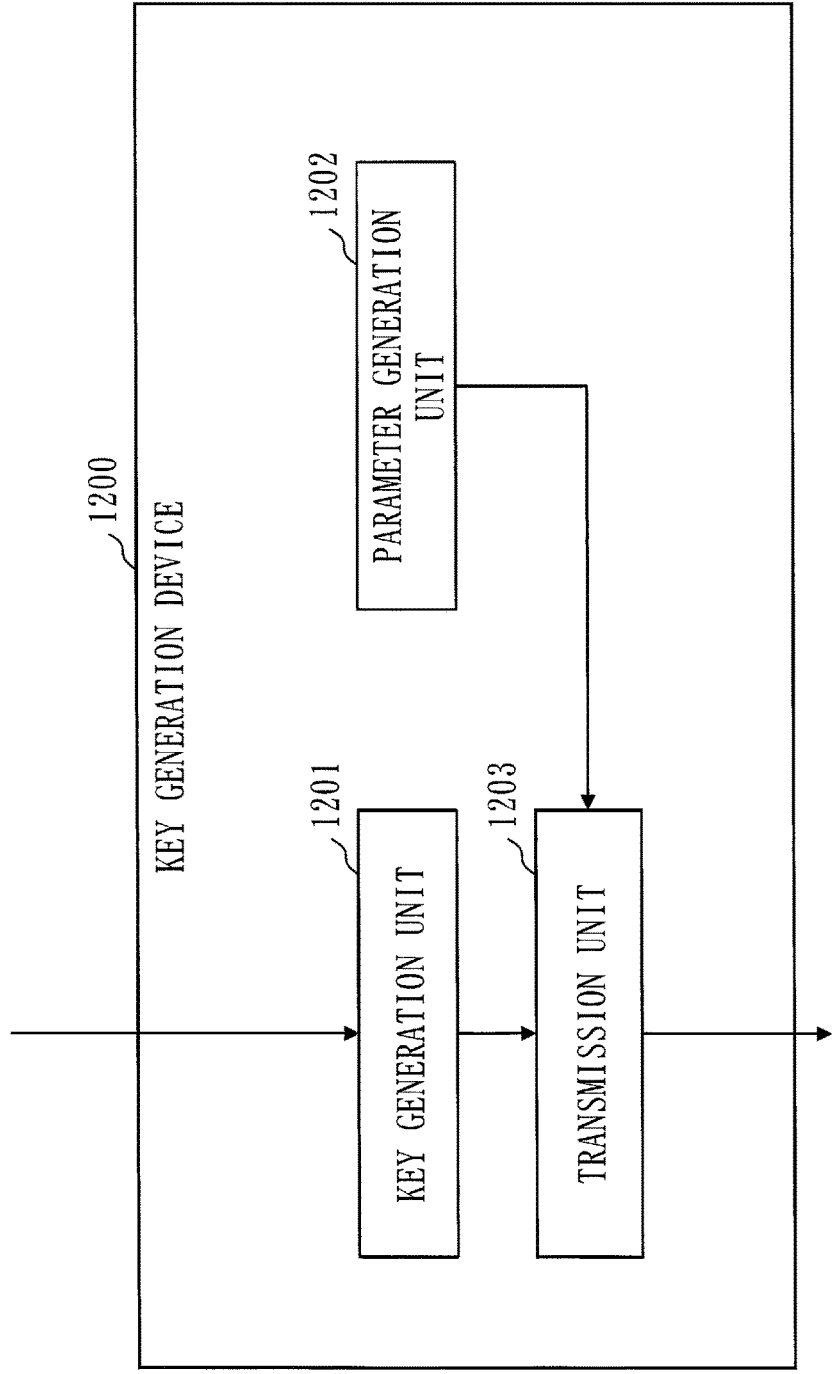
FIG. 14 is a diagram illustrating an example of a functional configuration of a key generation device according to the second embodiment.

FIG. 14 illustrates an example of a functional configuration of the key generation device 1200.

As illustrated in FIG. 14, the key generation device 1200 has a key generation unit 1201, a parameter generation unit 1202, and a transmission unit 1203. Note that although not illustrated in FIG. 14, the key generation device 1200 has a recording medium to store data used in the constituent elements of the key generation device 1200.

The key generation unit 1201 generates a key K. The key K is used for encryption of data and decryption of encrypted data. The key K is secret information to be stored in the registration device 200a and the search device 300a, so that it is generated strictly. Note that an example in which the key generation unit 1201 generates the key K using a common-key cryptographic technique will be described below. However, the key generation unit 1201 may generate the key K using a public-key cryptographic technique.

The parameter generation unit 1202 generates a parameter necessary for encryption of data and matching of data. For example, the parameter generation unit 1202 generates, as the parameter, a maximum length L of strings for dividing registration data into strings. Note that the maximum length L is an integer greater than 0. The maximum length L is not secret information, and thus may be made public.

The transmission unit 1203 transmits the key K generated by the key generation unit 1201 to the registration device 200a and the search device 300a. The transmission unit 1203 also transmits the parameter generated by the parameter generation unit 1202 to the registration device 200a and the management device 400a.

Note that an example of a hardware configuration of the registration device 200a, the search device 300a, and the management device 400a is as illustrated in FIG. 9. That is, the constituent elements illustrated in each of FIGS. 11, 12, and 13 are stored as the programs 922 in the auxiliary storage device 920. The processor 901 executes the programs 922 to realize the constituent elements illustrated in each of FIGS. 11, 12, and 13.

An example of a hardware configuration of the key generation device 1200 is also as illustrated in FIG. 9. That is, the constituent elements illustrated in FIG. 14 are stored as the programs 922 in the auxiliary storage device 920. The processor 901 executes the programs 922 to realize the constituent elements illustrated in FIG. 14.

Description of Operation

An example of the operation of the search system 800 according to this embodiment will be described below.

Figure 15:
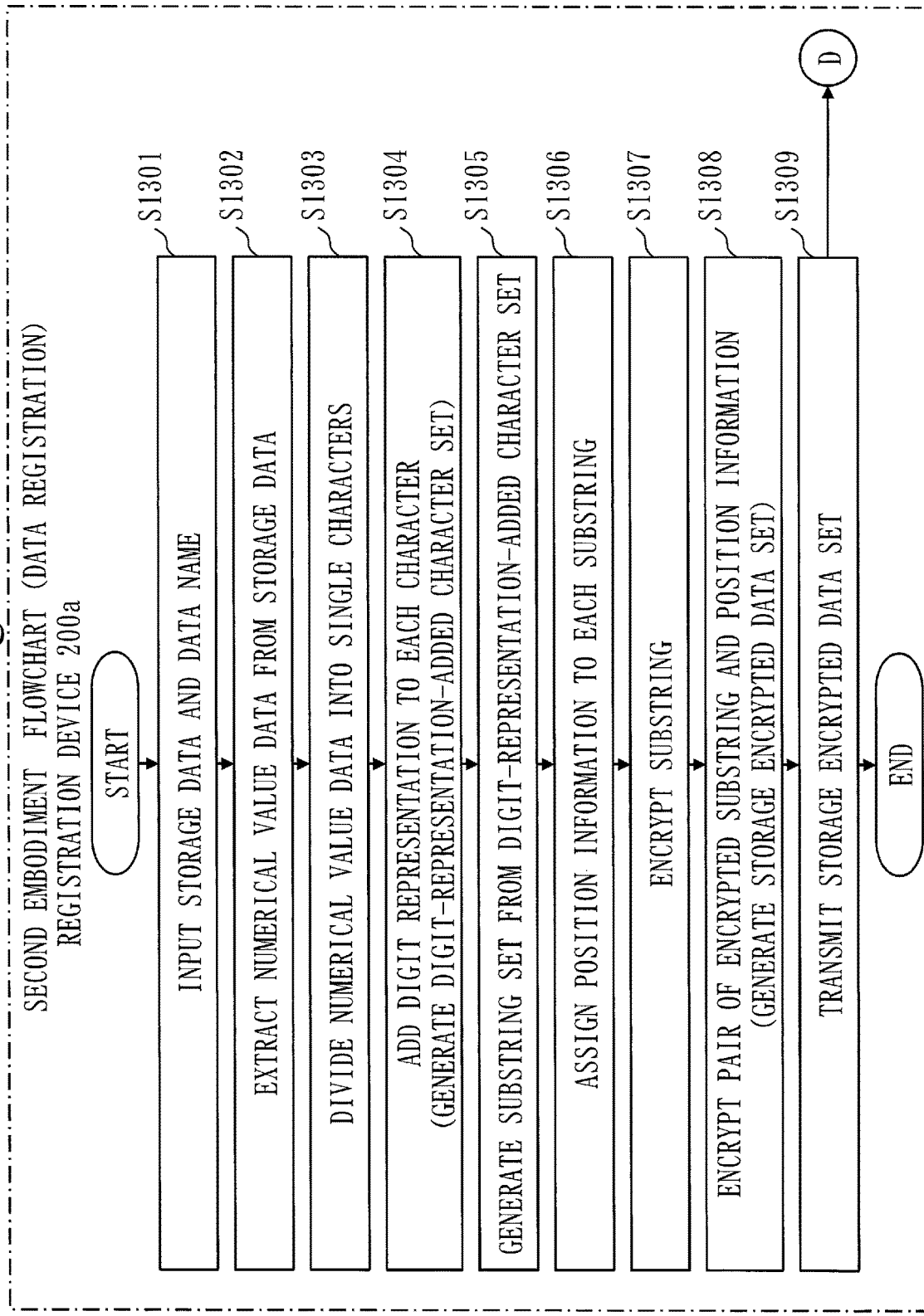
FIG. 15 is a flowchart illustrating a data registration process of the search system according to the second embodiment.
Figure 16:
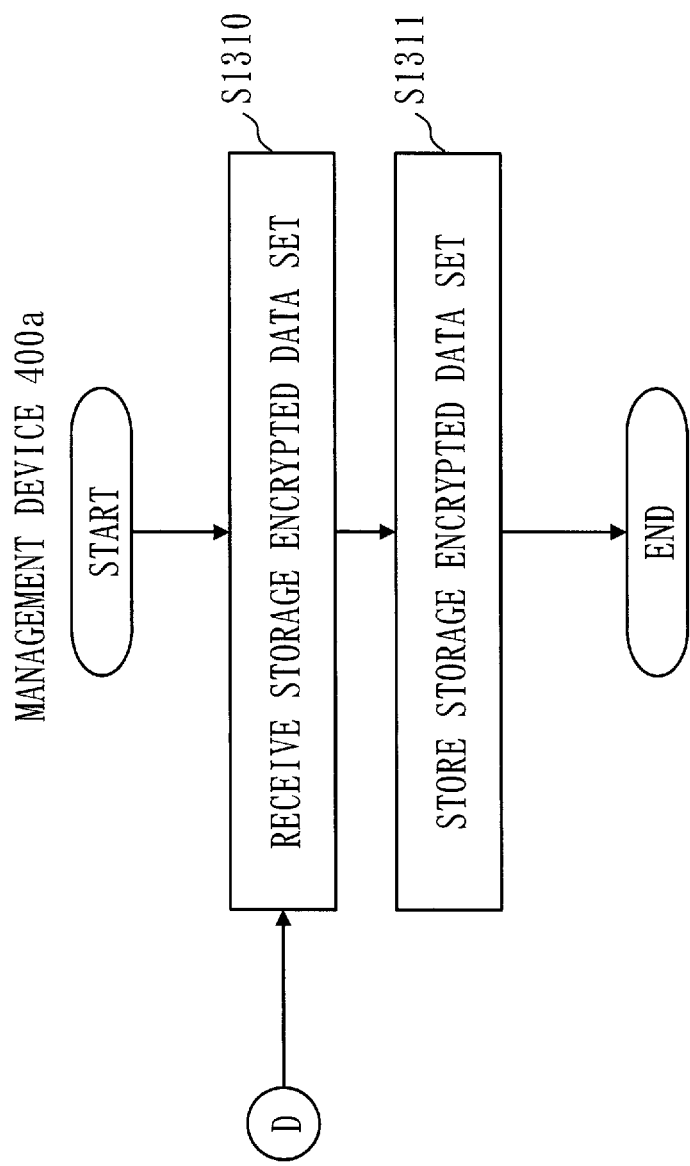
FIG. 16 is a flowchart illustrating the data registration process of the search system according to the second embodiment.

FIGS. 15 and 16 are flowcharts illustrating a registration process of the search system 800.

Steps S1301 to S1309 of FIG. 15 are a process executed by the registration device 200a. Steps S1310 to S1311 of FIG. 16 are a process executed by the management device 400a.

Steps S1301 to S1306 are the same as steps S501 to S506 of FIG. 5.

Therefore, description of steps S1301 to S1306 will be omitted.

In steps S1307 to S1308, the encryption unit 210 reads the key K from the key storage unit 209. Then, the encryption unit 210 generates a ciphertext C for each position-information-added substring set B(D) generated in step S1306 in the following manner. That is, the encryption unit 210 generates E(K, w) for each pair (p, w) of position information and a substring (step S1307) and generates C=E(E(K, w), p, ID(D)) (step S1308). Note that E is an encryption function. The encryption unit 210 generates the ciphertext C using, for example, a common-key cryptographic scheme such as the AES, a message authentication code such as the HMAC, or a hash function such as SHA-256.

As described above, the set of ciphertexts obtained by encrypting all (i, w) is referred to as the storage encrypted data C(D). As described above, the pair (ID(D), C(D)) is referred to as the storage encrypted data set.

In step S1309, the transmission unit 207a transmits the storage encrypted data set (ID(D), C(D)) generated in step S1308 to the management device 400a.

In step S1310, the reception unit 401a receives the storage encrypted data set (ID(D), C(D)) transmitted in step S1309.

In step S1311, the data storage unit 402a stores the storage encrypted data set (ID(D), C(D)) received in step S1310.

Step S1311 completes the registration process of the search system 800.

Figure 17:
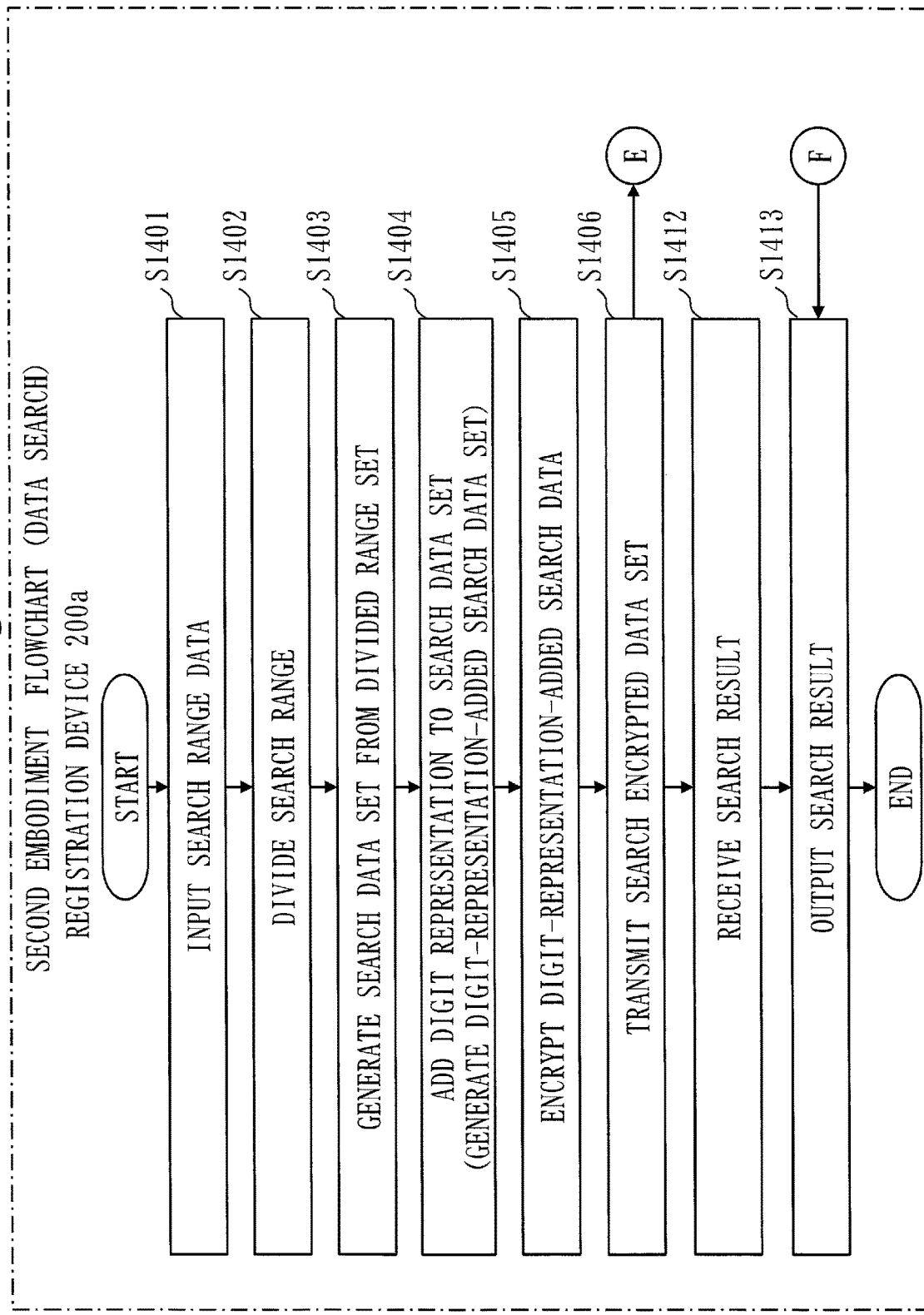
FIG. 17 is a flowchart illustrating a data search process of the search system according to the second embodiment.

FIGS. 17 and 18 are flowcharts illustrating a search process of the search system 800.

Steps S1401 to S1406 and steps S1412 to S1413 of FIG. 17 are a process executed by the search device 300a. Steps S1407 to S1411 of FIG. 18 are a process executed by the management device 400a.

Steps S1401 to S1404 are the same as steps S601 to S604 of FIG. 6. Therefore, description of steps S1401 to S1404 will be omitted.

In step S1405, the encryption unit 309 reads the key K from the key storage unit 308. Then, the encryption unit 309 generates encrypted digit-representation-added search data Qc, using the key K, for all Sc=(j, $w_L d_L \ldots w_j d_j$) included in the digit-representation-added search data set S generated in step S604 in the following manner. That is, the encryption unit 309 generates the encrypted digit-representation-added search data Qc by Qc=E(K, $w_L d_L \ldots w_j d_j$).

As described above, the set of search encrypted data obtained by encrypting all pieces of digit-representationadded search data $S_C$ included in the digit-representation-added search data set S is referred to as the search encrypted data set Q(S).

In step S1406, the transmission unit 305a transmits the search encrypted data set Q(S) generated in step S1405 to the management device 400a. If a storage data name has also been input together with the search range data from the data searcher in step S1401, the transmission unit 305a transmits both the search encrypted data set Q(S) and the storage data name to the management device 400a.

In step S1407, the reception unit 401a receives the search encrypted data set Q(S) transmitted in step S1406. If the storage data name has also been transmitted in step S1406, the reception unit 401a also receives the storage data name.

In step S1408, the matching unit 403a reads the storage encrypted data set (ID(D), C(D)) from the data storage unit 402a. If the reception unit 401a has also received the storage data name in step S1407, the matching unit 403a reads only the target storage encrypted data set (ID(D), C(D)) from the data storage unit 402a based on the storage data name. If the reception unit 401a has not received the storage data name in step S1407, the matching unit 403a reads all the storage encrypted data sets (ID(D), C(D)) stored in the data storage unit 402a.

In step S1409, based on ID(D) of the storage encrypted data set (ID(D), C(D)) read in step S1408, the matching unit 403a generates matching data Tp for ID(D) from each element Qc of the search encrypted data set Q(S) received in step S1407. Specifically, the matching unit 403a generates the matching data Tp by T1=E(Qc, 1, ID(D)), . . . , TL=E(Qc, L, ID(D)). When a plurality of storage encrypted data sets (ID(D), C(D)) have been read in step S1408, the matching unit 403a generates matching data Tp corresponding to each ID(D).

In step S1410, the matching unit 403a generates a set R which is an empty set R concerning a search result. The matching unit 403a checks whether each piece of matching data Tp ($1 \leq p \leq L$) generated in step S1409 is included in the storage encrypted data C(D). If the matching data Tp is included in the storage encrypted data C(D), the matching unit 403a adds a pair (ID(D), p) to the set R. When a plurality of sets of matching data Tp have been generated in step S1409, the matching unit 403a adds pairs concerning the search result described above to the same set R.

In step S1411, the transmission unit 404 transmits the search result R generated in step S1410 to the search device 300a.

In step S1412, the reception unit 306a receives the search result R transmitted in step S1411.

In step S1413, the output unit 307a outputs a message for notifying the search result R received in step S1412 to the data searcher. For example, the output unit 307a outputs a message "the search data appears at the p-th position of ID(D)" for each (ID(D), p) included in the search result R. When the set R is an empty set, the output unit 307a outputs a message "the search data is not included in any data".

Step S1413 completes the search process of the search system 800.

Description of Effects of Embodiment

According to this embodiment, the following effects can be obtained, for example.

(1) In this embodiment, storage data is encrypted and then stored. Thus, even if the storage encrypted data is leaked from the management device 400, the content of the storage data is never known.

(2) In this embodiment, search data can also be processed in an encrypted state. Thus, the content of the search data is never known from the search encrypted data.

(3) In this embodiment, only a data name and position information appear in a search result obtained from storage encrypted data and encrypted digit-representation-added search data. Thus, the contents of storage data and the contents of search data are never known to an entity that does not have the key K.

The embodiments of the present invention have been described above. These two embodiments may be implemented in combination.

Alternatively, one of these two embodiments may be partially implemented.

Alternatively, these two embodiments may be partially implemented in combination.

Note that the present invention is not limited to these embodiments, and various modifications are possible as necessary.

Description of Hardware Configuration

Finally, the hardware configuration will be described supplementarily.

The processor 901 illustrated in FIG. 9 is an integrated circuit (IC) that performs processing.

The processor 901 is a central processing unit (CPU), a digital signal processor (DSP), or the like.

The auxiliary storage device 920 illustrated in FIG. 9 is a read only memory (ROM), a flash memory, a hard disk drive (HDD), or the like.

The memory 902 illustrated in FIG. 9 is a random access memory (RAM).

The communication board 903 illustrated in FIG. 9 includes a receiver to receive data and a transmitter to transmit data.

The communication board 903 is, for example, a communication chip or a network interface card (NIC).

The programs for realizing the constituent elements in FIGS. 2 to 4 and FIGS. 11 to 13 may be stored in a portable storage medium, such as a magnetic disk, a flexible disk, an optical disc, a compact disc, a Blu-ray (registered trademark) disc, or a DVD.

The "unit" at the end of each constituent element in FIGS. 2 to 4 and FIGS. 11 to 13 may be replaced with "circuit", "step", "procedure", or "process".

Each of the registration device 200, the registration device 200a, the search device 300, the search device 300a, the management device 400, and the management device 400a may be realized by a processing circuit, such as a logic integrated circuit (IC), a gate array (GA), an application-specific integrated circuit (ASCI), or a field-programmable gate array (FPGA).

Note that the higher-level concept of the processor, the memory, a combination of the processor and the memory, and the processing circuit is referred to as "processing circuitry" in this Specification.

That is, each of the processor, the memory, a combination of the processor and the memory, and the processing circuit is a specific example of the "processing circuitry".

REFERENCE SIGNS LIST

100: search system, 101: network, 200: registration device, 200a: registration device, 201: input unit, 202: numerical value determination unit, 203: data division unit, 204: digit representation string addition unit, 205: substring generation unit, 206: position information assignment unit, 207: transmission unit, 207*a*: transmission unit, 208: reception unit, 209: key storage unit, 210: encryption unit, 300: search device, 300*a*: search device, 301: input unit, 302: search range division unit, 303: search data generation unit, 304: digit representation string addition unit, 305: transmission unit, 305*a*: transmission unit, 306: reception unit, 306*a*: reception unit, 307: output unit, 307*a*: output unit, 308: key storage unit, 309: encryption unit, 310: decryption unit, 401: reception unit, 401*a*: reception unit, 402: data storage unit, 402*a*: data storage unit, 403: matching unit, 403*a*: matching unit, 404: transmission unit, 800: search system, 901: processor, 902: memory, 903: communication board, 904: display, 905: keyboard, 906: mouse, 920: auxiliary storage device, 921: OS, 922: programs, 923: files, 1200: key generation device, 1201: key generation unit, 1202: parameter generation unit, 1203: transmission unit

The invention claimed is:

1. A search device that transmits a search condition to a management device that manages a numerical value which is a number sequence of one or more digits, based on a digit-by-digit correspondence between a number of each digit of the numerical value and a digit representation which is a symbol representing a digit, the search device comprising:
    processing circuitry to:
    perform grouping on a plurality of search-target numerical values to be searched for, each of said search-target numerical values being a number sequence of one or more digits, on a basis of commonality of the number of digits and commonality of a number sequence from a most significant digit, so as to generate one or more numerical value groups;
    generate, for each numerical value group, a search condition element by establishing a correspondence between a number of each digit of a sequence common range, which is a range of a number sequence common to search-target numerical values included in each numerical value group, and the digit representation of each digit of the sequence common range, and generate the search condition by integrating the search condition element of each numerical value group; and
    transmit the generated search condition to the management device.

2. The search device according to claim 1,
    wherein the processing circuitry extracts search-target numerical values that have a same number of digits and differ only in a number of a least significant digit from the plurality of search-target numerical values, and generates a numerical value group including the extracted search-target numerical values.

3. The search device according to claim 1,
    wherein the processing circuitry encrypts the generated search condition, and
    transmits the search condition that has been encrypted to the management device.

4. A search system comprising:
    a management device that manages a numerical value which is a number sequence of one or more digits, based on a digit-by-digit correspondence between a number of each digit of the numerical value and a digit representation which is a symbol representing a digit; and
    a search device that transmits a search condition to the management device,
    the search device including processing circuitry to:
    perform grouping on a plurality of search-target numerical values to be searched for, each of said search-target numerical values being a number sequence of one or more digits, on a basis of commonality of the number of digits and commonality of a number sequence from a most significant digit, so as to generate one or more numerical value groups;
    generate, for each numerical value group, a search condition element by establishing a correspondence between a number of each digit of a sequence common range, which is a range of a number sequence common to search-target numerical values included in each numerical value group, and the digit representation of each digit of the sequence common range, and generate the search condition by integrating the search condition element of each numerical value group; and
    transmit the generated search condition to the management device.

5. The search system according to claim 4, further comprising
    a registration device that establishes a digit-by-digit correspondence between a number of each digit of a management-target numerical value and the digit representation, the management-target numerical value being a number sequence of one or more digits to be managed by the management device, and
    transmits correspondence information indicating the digit-by-digit correspondence between the number of each digit of the management-target numerical value and the digit representation to the management device,
    wherein the management device manages the management-target numerical value, using the correspondence information.

6. The search system according to claim 4,
    wherein the registration device encrypts the correspondence information, and transmits the correspondence information that has been encrypted to the management device,
    wherein the management device manages the management-target numerical value, using the correspondence information that has been encrypted,
    wherein the processing circuitry of the search device encrypts the generated search condition, and
    transmits the search condition that has been encrypted to the management device.

7. A search method by a computer that transmits a search condition to a management device that manages a numerical value which is a number sequence of one or more digits, based on a digit-by-digit correspondence between a number of each digit of the numerical value and a digit representation which is a symbol representing a digit, the search method comprising:
    performing grouping on a plurality of search-target numerical values to be searched for, each of said search-target numerical values being a number sequence of one or more digits, on a basis of commonality of the number of digits and commonality of a number sequence from a most significant digit, so as to generate one or more numerical value groups;
    generating, for each numerical value group, a search condition element by establishing a correspondence between a number of each digit of a sequence common range, which is a range of a number sequence common to search-target numerical values included in each numerical value group, and the digit representation of each digit of the sequence common range, and generating the search condition by integrating the search condition element of each numerical value group; and transmitting the generated search condition to the management device.

8. A non-transitory computer readable medium storing a search program for a computer that transmits a search condition to a management device that manages a numerical value which is a number sequence of one or more digits, based on a digit-by-digit correspondence between a number of each digit of the numerical value and a digit representation which is a symbol representing a digit, the search program causing the computer to execute:

a grouping process to perform grouping on a plurality of search-target numerical values to be searched for, each of said search-target numerical values being a number sequence of one or more digits, on a basis of commonality of the number of digits and commonality of a number sequence from a most significant digit, so as to generate one or more numerical value groups;

a search condition generation process to generate, for each numerical value group, a search condition element by establishing a correspondence between a number of each digit of a sequence common range, which is a range of a number sequence common to search-target numerical values included in each numerical value group, and the digit representation of each digit of the sequence common range, and generate the search condition by integrating the search condition element of each numerical value group; and a transmission process to transmit the search condition generated by the search condition generation process to the management device.

* * * * *